United States Patent
Cho et al.

(10) Patent No.: US 10,063,832 B2
(45) Date of Patent: Aug. 28, 2018

(54) IMAGE PROCESSING METHOD AND APPARATUS

(71) Applicant: Samsung Electronics Co., Ltd., Suwon-si, Gyeonggi-do (KR)

(72) Inventors: Yang Ho Cho, Seongnam-si (KR); Hyoseok Hwang, Suwon-si (KR)

(73) Assignee: SAMSUNG ELECTRONICS CO., LTD., Gyeonggi-Do (KR)

(*) Notice: Subject to any disclaimer, the term of this patent is extended or adjusted under 35 U.S.C. 154(b) by 9 days.

(21) Appl. No.: 15/250,083

(22) Filed: Aug. 29, 2016

(65) Prior Publication Data

US 2017/0064280 A1 Mar. 2, 2017

(30) Foreign Application Priority Data

Sep. 1, 2015 (KR) .................. 10-2015-0123363

(51) Int. Cl.
  G06K 9/00 (2006.01)
  H04N 13/00 (2018.01)
  G06K 9/46 (2006.01)
  G06T 5/00 (2006.01)

(52) U.S. Cl.
  CPC ....... H04N 13/0018 (2013.01); G06K 9/4604 (2013.01); G06T 5/005 (2013.01); H04N 13/0011 (2013.01); *G06T 2207/10024* (2013.01); *G06T 2207/10028* (2013.01);
  (Continued)

(58) Field of Classification Search
  CPC ........... H04N 13/0018; H04N 13/0011; H04N 2013/0077; H04N 2013/0081

USPC ....... 382/154, 164, 165, 274, 275; 358/3.26, 358/3.27
  See application file for complete search history.

(56) References Cited

U.S. PATENT DOCUMENTS 6,366,635 B1 * 4/2002 Op De Beek .......... G06T 15/08
  378/4
6,965,684 B2 * 11/2005 Chen .................. G06K 9/00228
  382/103
(Continued)

FOREIGN PATENT DOCUMENTS

KR    10-1089344 B1    12/2011
KR    2012-0074925 A   7/2012
(Continued)

OTHER PUBLICATIONS

Tang et al. "Video Inpainting on Digitized Vintage Films via Maintaining Spatiotemporal Continuity," IEEE Transactions on Multimedia, 13(4). Aug. 2011.
(Continued)

*Primary Examiner* — Yosef Kassa
(74) *Attorney, Agent, or Firm* — Harness, Dickey & Pierce, P.L.C.

(57) ABSTRACT

An image processing method includes generating a target color image of a second viewpoint by warping a color image of a first viewpoint to the second viewpoint using a depth image corresponding to the color image of the first viewpoint; determining a conversion relationship of temporally neighboring color images among a plurality of color images of the second viewpoint, the plurality of color images including the target color image; and restoring a first hole of the target color image based on the conversion relationship.

23 Claims, 24 Drawing Sheets

(52) U.S. Cl.
CPC ............... *H04N 2013/0077* (2013.01); *H04N 2013/0081* (2013.01); *H04N 2013/0085* (2013.01)

(56) References Cited

U.S. PATENT DOCUMENTS

| | | | | |
|---|---|---|---|---|
| 7,089,790 | B2 * | 8/2006 | Silverbrook | B60C 23/0408 |
| | | | | 73/146 |
| 7,501,771 | B2 * | 3/2009 | Kawano | G09G 5/14 |
| | | | | 315/169.4 |
| 7,636,151 | B2 * | 12/2009 | Kothari | G01L 5/0047 |
| | | | | 356/35.5 |
| 7,826,112 | B2 * | 11/2010 | Sawada | H04N 1/56 |
| | | | | 358/1.9 |
| 8,045,242 | B2 * | 10/2011 | Sawada | H04N 1/56 |
| | | | | 358/1.9 |
| 8,089,515 | B2 * | 1/2012 | Chebil | G03B 13/36 |
| | | | | 348/169 |
| 8,351,084 | B2 * | 1/2013 | Bernal | H04N 1/4092 |
| | | | | 358/1.9 |
| 8,432,427 | B2 * | 4/2013 | Otana | B41J 2/473 |
| | | | | 347/261 |
| 8,704,875 | B2 * | 4/2014 | Cheng | H04N 13/0011 |
| | | | | 345/419 |
| 2011/0069237 | A1 | 3/2011 | Wang et al. | |
| 2011/0261050 | A1 | 10/2011 | Smolic et al. | |
| 2013/0128121 | A1 | 5/2013 | Agarwala et al. | |
| 2013/0162787 | A1 | 6/2013 | Cho et al. | |
| 2014/0119595 | A1 | 5/2014 | Gallo et al. | |

FOREIGN PATENT DOCUMENTS

| | | |
|---|---|---|
| KR | 2012-0082336 A | 7/2012 |
| KR | 2014-0021766 A | 2/2014 |
| KR | 2014-0058744 A | 5/2014 |
| WO | WO-2013049388 A1 | 4/2013 |

OTHER PUBLICATIONS

Jan. 5, 2017 European Search Report issued in European Application No. 16186637.1.

* cited by examiner

FIG. 19
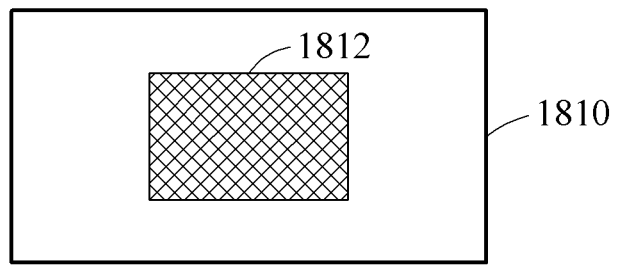
+
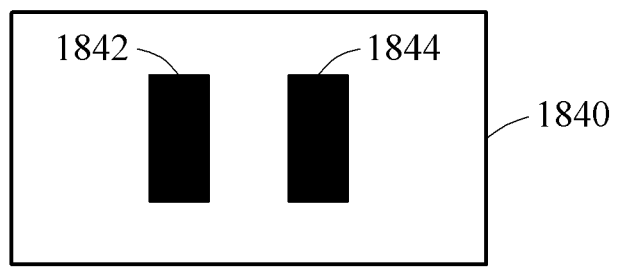
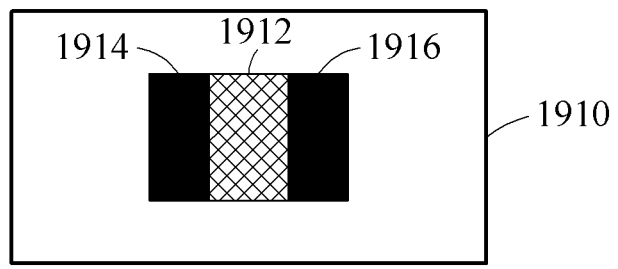

FIG. 21
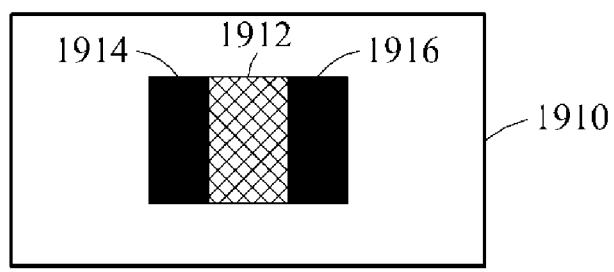
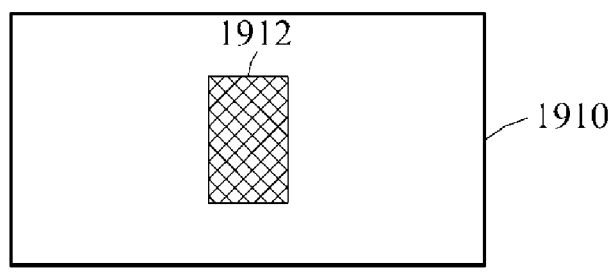

FIG. 23
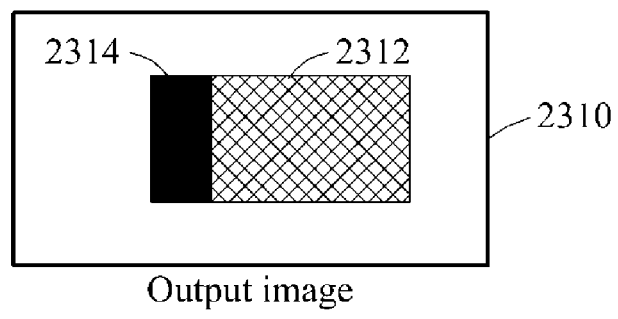
Output image
\+
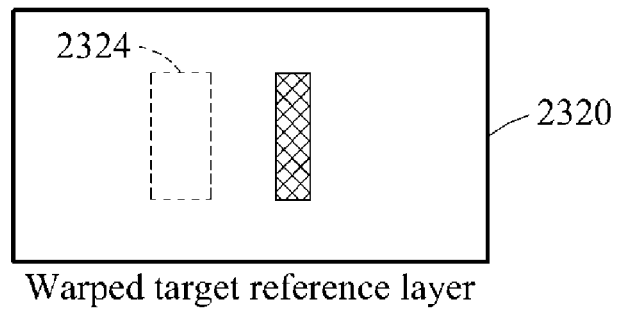
Warped target reference layer
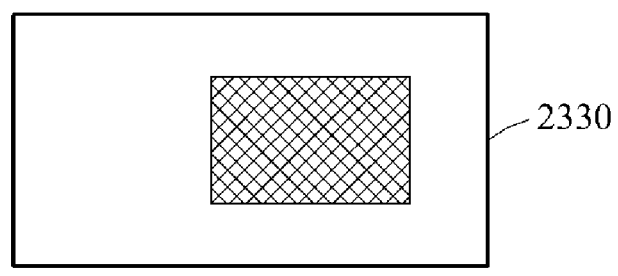
Hole-restored output image

IMAGE PROCESSING METHOD AND APPARATUS

CROSS-REFERENCE TO RELATED APPLICATION

This application claims under 35 U.S.C. § 119 to Korean Patent Application No. 10-2015-0123363, filed on Sep. 1, 2015, in the Korean Intellectual Property Office, the contents of which are incorporated herein by reference in their entirety.

BACKGROUND

1. Field

At least one example embodiment relates to an image processing method and/or apparatus, and more particularly, to a method and/or apparatus for generating an image in which a viewpoint is changed.

2. Description of the Related Art

A three-dimensional (3D) display device may display a 3D image.

An output image having various viewpoints may be generated to provide 3D effect to viewers viewing the image at various positions. The output image may be generated through interpolation of input images or extrapolation of a single input image. In this example, when a plurality of output images is generated based on a fewer number of input images, an area that is not be viewed in an input image and to be viewed in an output image may need to be processed. That is, the area may be a visible area in terms of the output image. The area may be referred to as a hole. Among various hole processing methods, a method in which a hole-filling is separately performed for each output image may be applied to this disclosure.

SUMMARY

Some example embodiments relate to an image processing method.

An image processing method includes generating a target color image of a second viewpoint by warping a color image of a first viewpoint to the second viewpoint using a depth image corresponding to the color image of the first viewpoint; determining a conversion relationship of temporally neighboring color images among a plurality of color images of the second viewpoint, the plurality of color images including the target color image; and restoring a first hole of the target color image based on the conversion relationship.

The method may further include restoring a remaining hole of the target color image using the target color image.

The conversion relationship may indicate a homography of the temporally neighboring color images.

The calculating may include extracting a background feature of the plurality of color images; and calculating the conversion relationship based on the extracted background feature.

The extracting may include extracting a plurality of features of the plurality of color images; ranking the plurality of features based on a depth using depth values corresponding to the features; and determining a first number of plurality of features among the ranked features to be the extracted background feature.

The extracting of the plurality of features may include extracting a structure in the plurality of color images as at least one feature of the plurality of features.

The calculating of the conversion relationship based on the background feature may include detecting a first background feature of a first color image based on the extracted background image; detecting a second background feature of a second color image based on the extracted background image; matching the first background feature and the second background feature; and calculating the conversion relationship based on a result of the matching, wherein the first color image and the second color image are the temporally neighboring color images.

The restoring may include converting each of the plurality of color images to a target plane of the target color image based on the conversion relationship; and restoring the first hole based on a result of the converting.

The restoring of the hole based on the result of the converting may include allocating a depth value of a background area located adjacent to a second hole of a target depth image corresponding to the target color image to the second hole, the second hole corresponding to the first hole; detecting depth reference areas corresponding to the second hole from a plurality of depth images corresponding to the plurality of color images converted to the target plane; detecting color reference areas of the plurality of color images converted to the target plane, the color reference areas corresponding to the depth reference areas; and restoring the first hole based on the color reference areas.

The detecting of the depth reference areas may include detecting areas having the same coordinates as coordinates of the second hole from the plurality of depth images; and determining, to be the depth reference areas, areas of depth values among the detected areas, each having a difference from the depth value allocated to the second hole that is less than or equal to a threshold.

The restoring of the first hole based on the color reference areas may include restoring the first hole by setting an average of color values of the color reference areas to be a color value of the hole.

The restoring of the first hole based on the color reference areas may include restoring the first hole by setting a color value having a greatest appearance frequency among color values of the color reference areas, to be a color value of the hole.

According to at least some example embodiments, an image processing apparatus may include a memory storing computer-readable instructions; and one or more processors configured to execute the computer-readable instructions such that the one or more processors are configured to, generate a target color image of a second viewpoint by warping a color image of a first viewpoint to the second viewpoint based on a depth image corresponding to the color image of the first viewpoint, and determine a conversion relationship between temporally neighboring color images among a plurality of color images of the second viewpoint, the plurality of color images of the second viewpoint including the target color image, and restore a first hole of the target color image based on the conversion relationship.

According to at least some example embodiments, an image processing method may include determining a reference viewpoint based on a plurality of viewpoints of a plurality of input color images; determining a target reference layer corresponding to the reference viewpoint based on the plurality of input color images; determining a conversion relationship between temporally neighboring reference layers among a plurality of reference layers of the reference viewpoint, the plurality of reference layers including the target reference layer; allocating a maximum hole to be generated through a warping of the target reference layer, to the target reference layer; restoring the maximum hole based on the conversion relationship; generating an output color image by warping at least one of the plurality of input color images to an output viewpoint; and restoring a hole of the output color image based on the target reference layer.

The method may further include restoring a remaining hole of the target reference layer based on the target reference layer.

The conversion relationship may indicate a homography of the temporally neighboring reference layers.

The calculating of the conversion relationship may include extracting a background feature of the target reference layer; and calculating the conversion relationship based on the background feature.

The restoring of the maximum hole may include converting the plurality of reference layers to a target plane of the target reference layer based on the conversion relationship; and restoring the maximum hole based on a result of the converting.

According to at least some example embodiments, an image processing method includes receiving one or more input color images of one or more viewpoints, respectively, setting a viewpoint from among the one or more viewpoints as a reference viewpoint; setting a reference layer, from among the one or more input color images, as a target reference layer, the target reference layer corresponding to the reference viewpoint; determining a plurality of conversion relationships by determining, for each temporally adjacent pair of reference layers among a plurality of reference layers of the reference viewpoint, a corresponding conversion relationship, the plurality of reference layers including the target reference layer; warping the target reference layer to one or more viewpoints such that the target reference layer includes one or more holes; restoring the target reference layer by restoring the one or more holes of the target reference layer based on the plurality of conversion relationships; generating an output color image by warping an image from among the input color images to a first viewpoint such that the output color image includes a hole; restoring the hole of the output color image based on the restored target reference layer.

The one or more input color images may have a same temporal location, and the plurality of reference layers may have different temporal locations.

Each conversion relationship, from among the plurality of conversion relationships, may indicate a homography of the temporally adjacent pair of reference layers to which the conversion relationship corresponds.

The restoring the one or more holes of the target reference layer may include generating a plurality of converted reference layers by converting the plurality reference layers to a target plane of the target reference layer based on the plurality of conversion relationships; and restoring the one or more holes of the target reference layer based on the plurality of converted reference layers.

The restoring the hole of the output color image based on the restored target reference layer may include replacing the hole of the output color image with a portion of the restored target reference layer, the portion of the restored target reference layer having a location within the restored target reference layer that corresponds to the location of the hole of the output color image within the output color image.

BRIEF DESCRIPTION OF THE DRAWINGS

The above and other features and advantages of example embodiments of the inventive concepts will become more apparent by describing in detail example embodiments of the inventive concepts with reference to the attached drawings. The accompanying drawings are intended to depict example embodiments of the inventive concepts and should not be interpreted to limit the intended scope of the claims. The accompanying drawings are not to be considered as drawn to scale unless explicitly noted.

FIG. 19 illustrates an example of a target reference layer to which a maximum hole is allocated;

FIG. 21 illustrates an example of a target reference layer in which a maximum hole is restored;

FIG. 23 illustrates an example of an output image in which a hole is restored.

DETAILED DESCRIPTION

Figure 1:
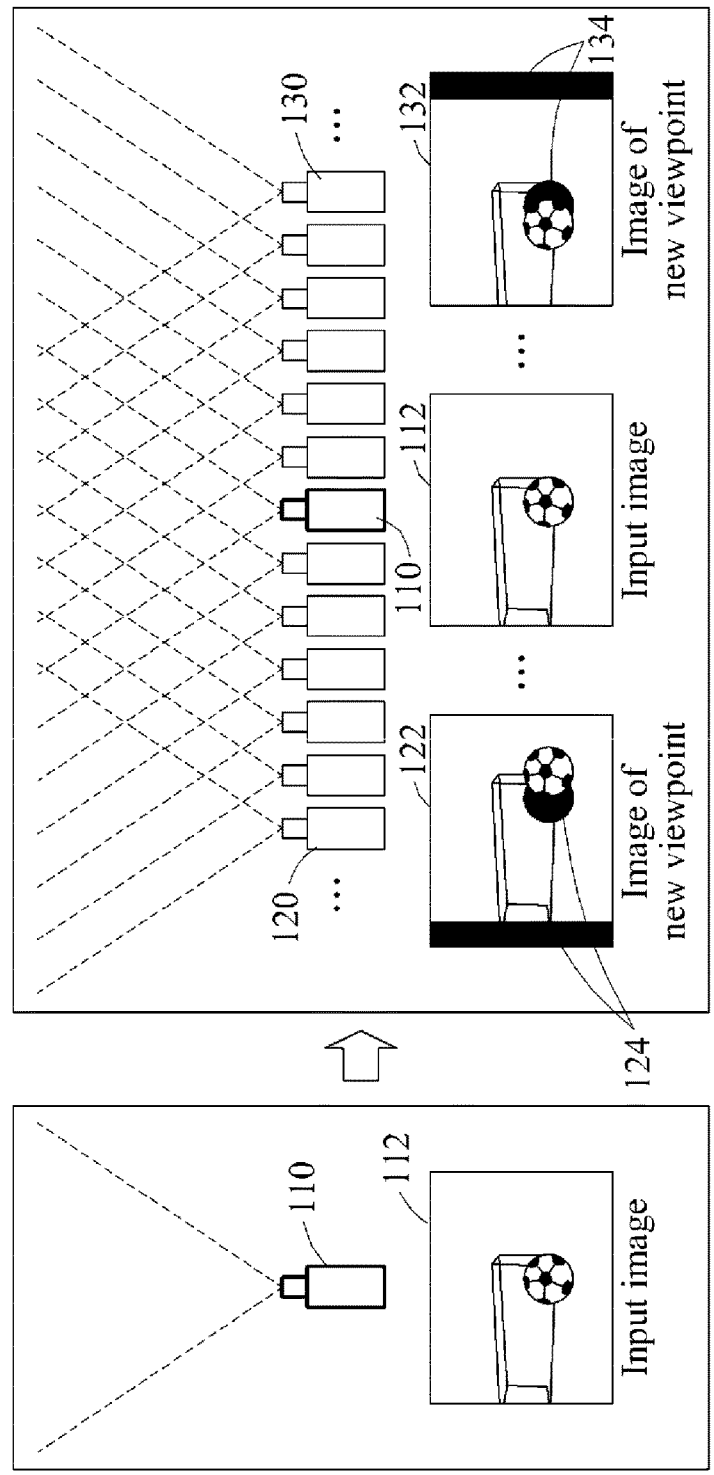
FIG. 1 illustrates an example of an image having a new viewpoint generated based on an input image.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

It should be understood, however, that there is no intent to limit this disclosure to the particular example embodiments disclosed. On the contrary, example embodiments are to cover all modifications, equivalents, and alternatives falling within the scope of the example embodiments. Like numbers refer to like elements throughout the description of the figures.

In addition, terms such as first, second, A, B, (a), (b), and the like may be used herein to describe components. Each of these terminologies is not used to define an essence, order or sequence of a corresponding component but used merely to distinguish the corresponding component from other component(s). It should be noted that if it is described in the specification that one component is "connected", "coupled", or "joined" to another component, a third component may be "connected", "coupled", and "joined" between the first and second components, although the first component may be directly connected, coupled or joined to the second component.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Various example embodiments will now be described more fully with reference to the accompanying drawings in which some example embodiments are shown. In the drawings, the thicknesses of layers and regions are exaggerated for clarity.

Unless otherwise defined, all terms including technical and scientific terms used herein have the same meaning as commonly understood by one of ordinary skill in the art to which these example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

In this disclosure, the term "image" may indicate, for example, a still image and a frame of a moving image. The term "image" may have the same meaning as that of the term "video" and thus, may be interchangeably used with the term "video".

A color image may be, for example, an image including pixels having color values.

A depth image may be, for example, an image including pixels having depth values.

According to at least some example embodiments, a depth image corresponding to a color image may include pixels that indicate depth values of corresponding pixels in the color image. According to at least some example embodiments, the depth image may be generated by a depth camera or a laser. As another example, the depth image may be generated based on a depth prediction method.

A depth and a disparity may be inversely correlated using a constant term. Thus, in this disclosure, the term "depth" may be interchangeably used with the term "disparity". Additionally, an operation of converting the depth to the disparity or an operation of converting the disparity to the depth may be implemented in the following examples in accordance with known methods.

FIG. 1 illustrates an example of an image having a new viewpoint generated based on an input image.

The input image 112 may be an image acquired by capturing a scene at a desired or, alternatively, predetermined viewpoint. The desired or, alternatively, predetermined viewpoint may also be referred to as, for example a first viewpoint 110. For example, the input image 112 may be acquired using a camera at the first viewpoint 110. The input image 112 may be a color image. A depth image corresponding to the input image 112 may be acquired as well and may represent a depth of the scene captured at the first viewpoint 110.

Although FIG. 1 illustrates one input image, for example, the input image 112, the present disclosure is not limited thereto. According to at least some example embodiments, differing input images acquired at viewpoints differing from the first viewpoint 110 may be provided in addition to the input image 112.

An image having a new viewpoint, for example, viewpoints 120 through 130, differing from the first viewpoint 110 may be generated based on the input image 112. According to at least some example embodiments, the new viewpoint may be, for example, a viewpoint at which a scene is not directly acquirable by using a camera. The new viewpoint may be a virtual viewpoint.

Output images 122 and 132 may be images acquired by photographing a scene at the viewpoints 120 and 130. In the present disclosure, an image captured at a particular viewpoint or generated as if the image was captured at the particular viewpoint may be referred to as an image of the particular viewpoint and/or an image corresponding to the particular viewpoint. Similarly, a viewpoint to which an image corresponds may be referred to as a viewpoint of the image.

According to at least some example embodiments, the output images 122 and 132 may be generated by warping the input image 112. For example, the output images 122 and 132 may be generated based on the input image 112 and a depth image corresponding to the input image 112.

As used in the present disclosure, the term "warp" or "warping" may indicate an operation of shifting coordinates for each pixel of an image based on depth information of the image. A degree to which a pixel is shifted may increase according to a decrease in a depth of the pixel. The depth information of the image may be obtained based on a depth image. For example, as will be discussed in greater detail below, a first image captured at a first viewpoint may be warped to generate a second image such that the second image is a representation of the first image as if the first image was captured at a second viewpoint different from the first viewpoint. This process may also be described herein as warping the first image to the second viewpoint. According to at least some example embodiments, the warping may include shifting a position of a foreground portion of the first image relative to a position of a background portion of the first image such that the second image is a representation of the first image as if the first image was captured at the second viewpoint.

When a viewpoint of the input image 112 is warped, a hole may be generated in the output images 122 and 132. The hole may indicate, for example, a hole pixel and an area of hole pixels.

In response to the warping, the hole may be generated due to a difference in depth between a foreground and a background in the image and a resulting change in the positions of the foreground and a background relative to each other as is shown in the output images 122 and 132 of FIG. 1. In the example illustrated by FIG. 1, the foreground of the input image 112 includes a soccer ball and the background of the input image 112 includes a soccer goal. In the input image 112, a distance between the soccer ball and a camera may be shorter than a distance between the camera and a background. Thus, in response to a change in the viewpoint, a portion of the background that is obscured by the ball in the input image 112 may appear as the ball-shaped hole in the output images 122 and 132.

According to at least some example embodiments, images temporally related to the output images 122 and 132 may be used to restore the holes in the output images 122 and 132. The temporally related images may be, for example, images of an output video including the output images 122 and 132.

As an example, when the input image 112 is a $t^{th}$ frame of a plurality of frames included in an input video, each of the output images 122 and 132 may correspond to a $t^{th}$ frame of a plurality of frames included in an output video. In this example, the image temporally related to the output images 122 and 132 may be a frame, other than the $t^{th}$ frame, from among the plurality of frames included in the output video. Frames of a video may be arranged temporally (i.e., with respect to display time) in ascending order. For example, a $t^{th}$ input image is followed by a $(t+1)^{th}$ input image, which is followed by a $(t+2)^{th}$ input image, etc. Notation in the form of "t", "t+1", "t+2," "t+n," etc., as used in the present disclosure with respect to frames or images, identifies relative temporal locations of the frames or images.

Descriptions related to a method of restoring a hole of the output images 122 and 132 will be provided with reference to FIGS. 2 through 24.

Figure 2:
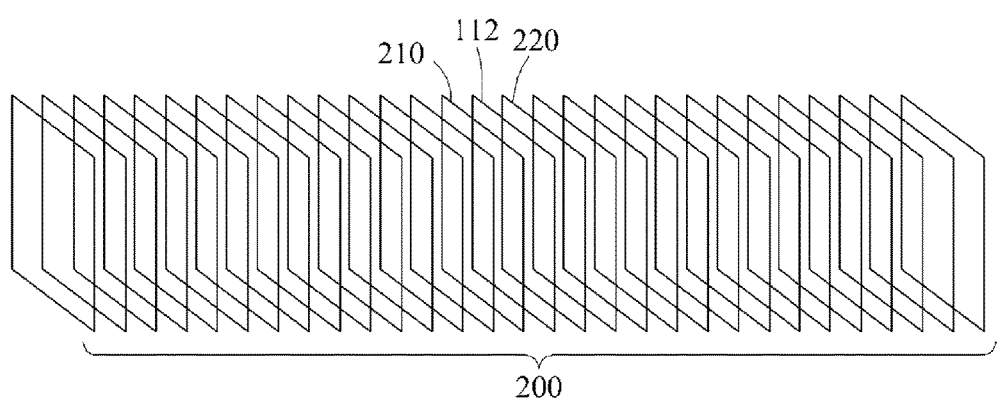
FIG. 2 illustrates an example of a plurality of input images.

FIG. 2 illustrates a plurality of input images 200.

The plurality of input images 200 may be the plurality of frames included in aforementioned input video. An input video 200 may include a $(t-1)^{th}$ input image 210, a $t^{th}$ input image, for example, the input image 112, and a $(t+1)^{th}$ input image 220.

The $(t-1)^{th}$ input image 210 and the $t^{th}$ input image 112 may be temporally neighboring images. The $t^{th}$ input image 112 and the $(t+1)^{th}$ input image 220 may be temporally neighboring images. The term "temporally neighboring" as used herein with respect to images or frames refers to images or frames that have temporal locations that are adjacent to each other or, alternatively, relatively close.

An output video may be generated by converting each image of an input video to a second viewpoint. Descriptions related to the output video will be provided with reference to FIG. 5.

Figure 3:
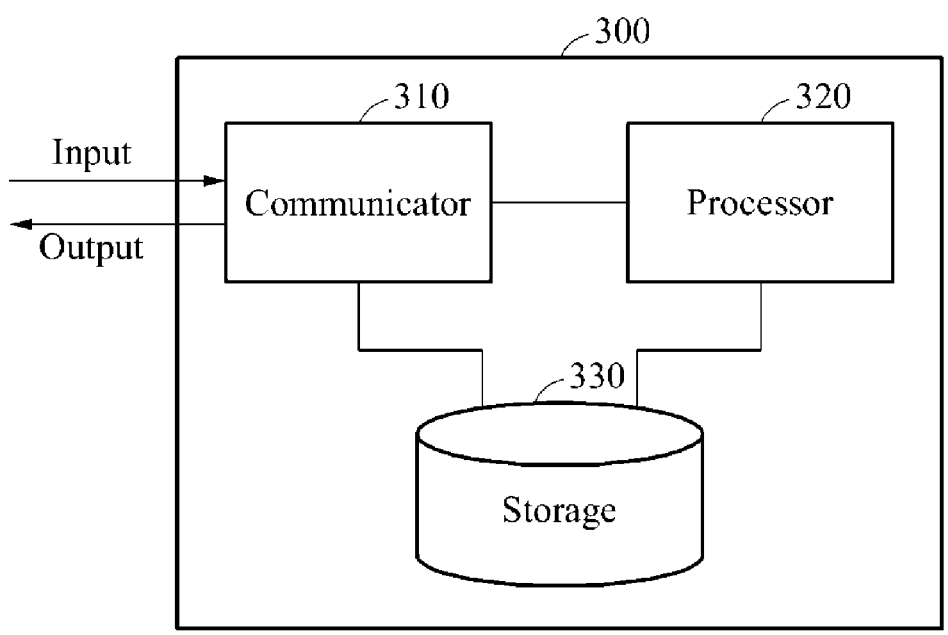
FIG. 3 is a block diagram illustrating an example of an image processing apparatus.

FIG. 3 is a block diagram illustrating an image processing apparatus 300.

Referring to FIG. 3, the image processing apparatus 300 may include a communicator 310, a processor 320, and storage 330. Hereinafter, the image processing apparatus 300 may also be referred to as, for example, an apparatus 300.

The communicator 310 may receive an input video or an input image from another apparatus. According to at least some example embodiments, the communicator 310 may also be referred to in the present disclosure as "communicator circuit 310," and may be embodied by, for example, circuits or circuitry configured to send and receive data.

The processor 320 may process the data received by the communicator 310 and data included in the storage 330.

The term 'processor', as used in the present disclosure, may refer to, for example, a hardware-implemented data processing device having circuitry that is physically structured to execute desired operations including, for example, operations represented as code and/or instructions included in a program. Examples of the above-referenced hardware-implemented data processing device include, but are not limited to, a microprocessor, a central processing unit (CPU), a processor core, a multi-core processor; a multi-processor, an application-specific integrated circuit (ASIC), and a field programmable gate array (FPGA). Processors executing program code are programmed processors, and thus, are special-purpose computers.

According to at least some example embodiments, the processor 320 may execute computer-readable code (e.g., software) that is stored in memory (e.g., storage 330) and includes instructions for causing the processor 320 to carry out and/or control some or all of the operations described in the present disclosure as being performed by the image processing apparatus 300 (or an element thereof).

The storage 330 may store the data received by the communicator 310 and the data processed by the processor 320. The storage 330 may store, for example, the input video and the input image.

Examples of the types of memory that the storage 320 may be include, but are not limited to, one or more of volatile memory, non-volatile memory, random access memory (RAM), flash memory, a hard disk drive, and an optical disk drive.

The storage 330 may store an instruction set (e.g., software) for performing an image processing. The instruction set for performing the image processing may be executed by the processor 320.

The processor 320 may perform the image processing based on the instruction set.

Descriptions related to the communicator 310, the processor 320, and the storage 330 will be provided with reference to FIGS. 4 through 24.

Figure 4:
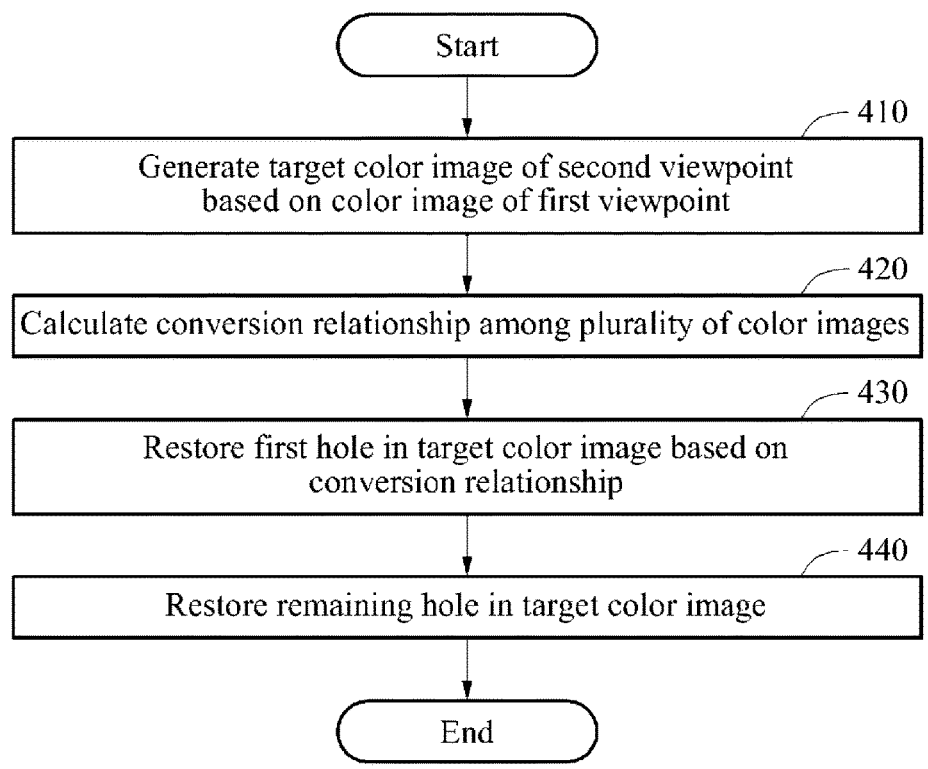
FIG. 4 is a flowchart illustrating an example of an image processing method.

FIG. 4 is a flowchart illustrating an example of an image processing method.

In advance to operation 410, the communicator 310 may receive an input video or an input image from another apparatus. The other apparatus may be, for example, a camera configured to photograph the input video and/or the input image.

In operation 410, the processor 320 may generate a target color image of a second viewpoint by warping a color image of a first viewpoint to the second viewpoint based on a depth image corresponding to the color image of the first viewpoint.

The first viewpoint may be a photographing viewpoint of the camera and the second viewpoint may be an output viewpoint. The target color image may indicate color values of an output image.

In operation 410, the processor 320 may generate a target depth image of the second viewpoint by warping a depth image corresponding to the color image of the first viewpoint to the second viewpoint. The target color image of the second viewpoint and the target depth image of the second viewpoint may correspond to each other. For example, according to at least some example embodiments, a pixel of the target color image of the second viewpoint and a pixel of the target depth image of the second viewpoint having the same coordinates as the pixel of the target color image may correspond to each other.

Since a method of generating the target color image of the second viewpoint through a warping may be generally known technique in a field of generating an image having a virtual viewpoint, related descriptions will be omitted for increased clarity and conciseness.

The generated target color image of the second viewpoint may include a first hole. The generated target depth image of the second viewpoint may include a second hole. The first hole and the second hole may correspond to each other. For example, a pixel of the second hole in the target depth image may have the same coordinates as that of a pixel of the first hole in the target color image.

In operation 420, the processor 320 may calculate a conversion relationship of temporally neighboring color images among a plurality of color images of the second viewpoint including the target color image of the second viewpoint.

According to at least some example embodiments, the conversion relationship may be a homography of the temporally neighboring color images.

Descriptions related to a method of calculating the conversion relationship will be provided with reference to FIGS. 6 through 9.

In operation 430, the processor 320 may restore the first hole in the target color image of the second viewpoint based on the conversion relationship.

In operation 440, the processor 320 may restore the second hole in the target depth image of the second viewpoint based on the conversion relationship.

The first hole in the target color image of the second viewpoint may be restored through the foregoing operations 410 through 430.

Operation 440 may be additionally performed when a hole remaining after operations 410 through 430 is present in the target color image.

In operation 440, the processor 320 may set a patch including the remaining hole within the target color image of the second viewpoint. The processor 320 may detect an optimal patch within the target color image of the second viewpoint, which is most similar to the set patch. The processor 320 may restore a remaining hole in the target color image of the second viewpoint based on the optimal patch.

Further, according to at least some example embodiments, if no hole remains in the target color image after operations 410 through 430, operation 440 may not be performed.

According to at least some example embodiments, the processor 320 may set a patch including a hole, and search the target color image of the second viewpoint for an optimal patch which is the most similar patch to the set patch or, alternatively, search the target color image of the second viewpoint for a desired patch which is a patch having a level of similarity with respect to the set patch that exceeds a threshold value.

Figure 5:
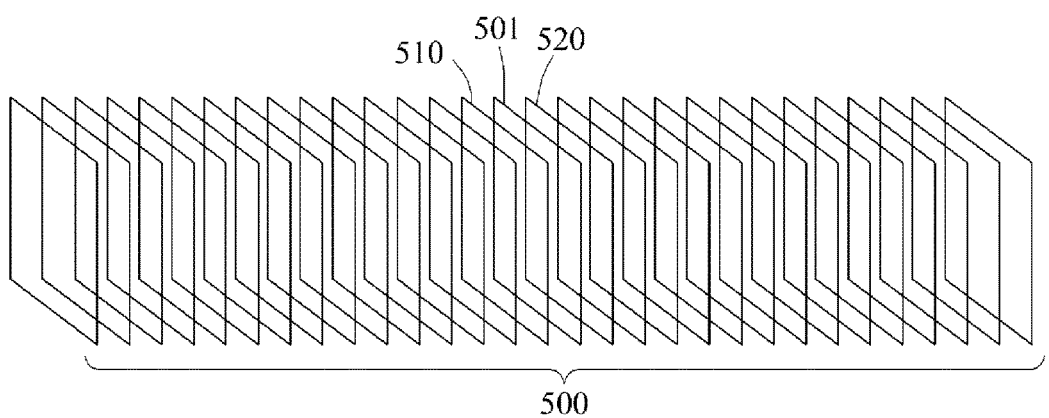
FIG. 5 illustrates an example of a plurality of color images having a new viewpoint.

FIG. 5 illustrates an example of a plurality of color images having a new viewpoint.

The processor 320 may generate an output video 500 by warping the input video 200 to a second viewpoint. For example, the processor 320 may generate the output video 500 by warping each image of the input video 200 to the second viewpoint.

The $(t-1)^{th}$ input image 210, the $t^{th}$ input image 112, and the $(t+1)^{th}$ input image 220 may correspond to a $(t-1)^{th}$ output image 510, a $t^{th}$ output image 501, and a $(t+1)^{th}$ output image 520. The $t^{th}$ output image 501 may also be referred to as a target color image 501.

The output video 500 may include a plurality of color images including the target color image 501 as well as output images 510 and 520. The output video 500 may also be referred to as, for example, a plurality of color images 500.

Figure 6:
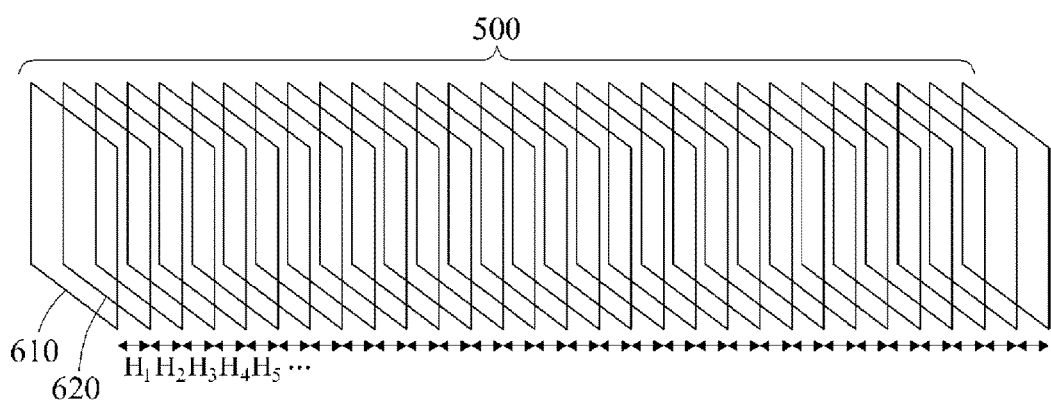
FIG. 6 illustrates an example of a conversion relationship of a plurality of color images.

FIG. 6 illustrates an example of a conversion relationship of a plurality of color images.

The processor 320 may calculate a conversion relationship of temporally neighboring color images among the plurality of color images 500. A plurality of results may be obtained as the calculated conversion relationship.

As an example, a first color image 610 and a second color image 620 may be temporally neighboring color images. The processor 320 may calculate a conversion relationship between the first color image 610 and the second color image 620. The conversion relationship between the first color image 610 and the second color image 620 may be denoted as H1.

A conversion relationship between the second color image 620 and a third color image temporally neighboring the second color image 620 may be denoted as H2.

Figure 7:
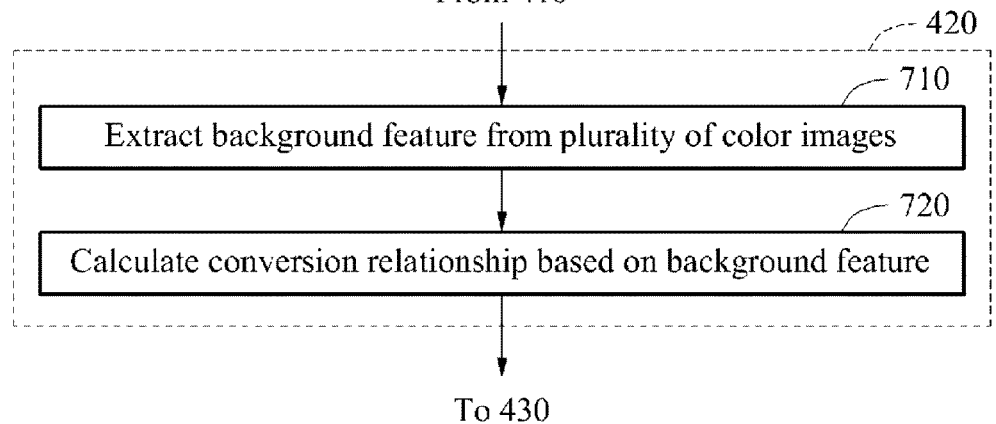
FIG. 7 is a flowchart illustrating an example of a method of calculating a conversion relationship.

FIG. 7 is a flowchart illustrating an example of a method of calculating a conversion relationship.

The foregoing operation 420 may include operations 710 and 720.

In operation 710, the processor 320 may extract a background feature from a plurality of color images.

According to at least some example embodiments, the processor 320 may extract a background feature included in at least one of the color images (e.g., the color images 500).

In another example, the processor 320 may extract a background feature of a target color image (e.g., the target color image 501).

Figure 8:
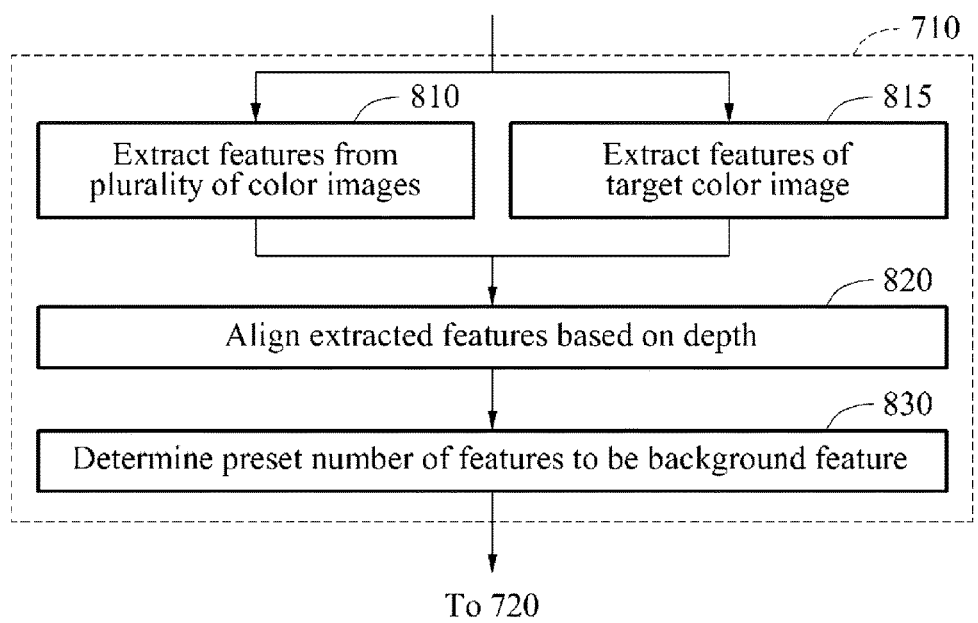
FIG. 8 is a flowchart illustrating an example of a method of extracting a background feature.

Descriptions related to a method of extracting the background feature from the plurality of color images will be provided with reference to FIG. 8.

In operation 720, the processor 320 may calculate a conversion relationship of temporally neighboring color images among the plurality of color images based on the background feature.

Figure 9:
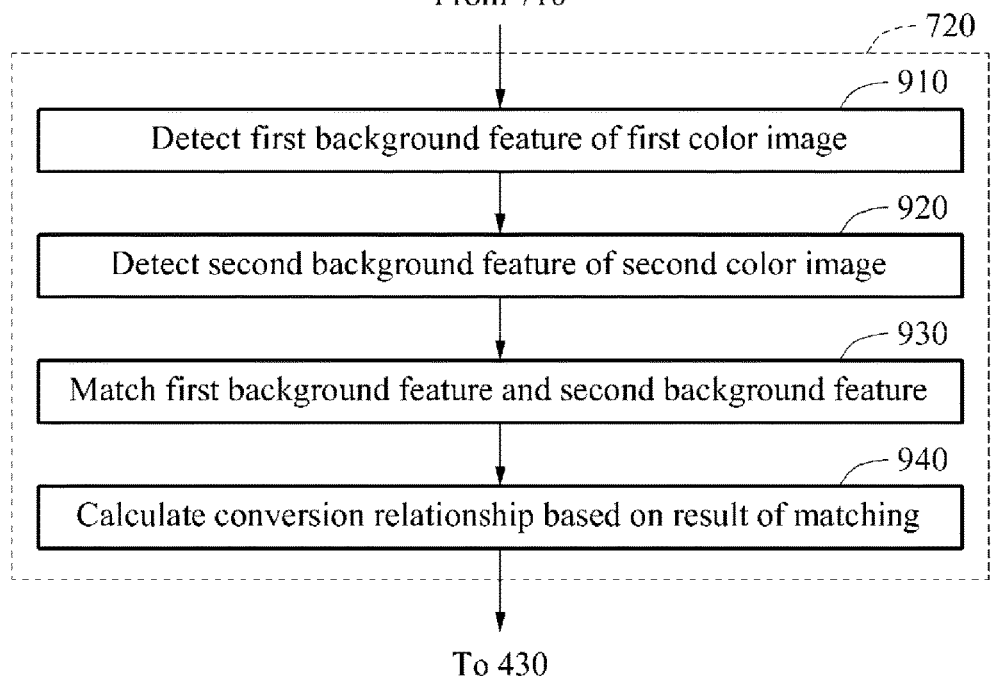
FIG. 9 is a flowchart illustrating an example of a method of calculating a conversion relationship based on a background feature.

Descriptions related to a method of calculating the conversion relationship based on the background feature will be provided with reference to FIG. 9.

FIG. 8 is a flowchart illustrating an example of a method of extracting a background feature.

The foregoing operation 710 may include operations 810 through 830.

In operation 810, the processor 320 may extract features from a plurality of color images. For example, the processor 320 may extract a feature of at least one of the plurality of color images.

According to at least some example embodiments, the processor 320 may extract a structure of the plurality of color images as the feature. The structure may include, for example, a texture, a corner, and an edge.

The extracted feature may include a depth value corresponding to the feature. For example, a feature of a color image may correspond to a depth value of a pixel included in a depth image when the pixel has the same coordinates in the depth image as those of the feature in the color image.

In another example, the processor 320 may extract a gradient of the plurality of color images as the feature.

In operation 815, the processor 320 may extract features of a target color image.

According to at least some example embodiments, operation 810 and operation 815 may be performed selectively.

In operation 820, the processor 320 may align the extracted features based on a depth.

According to at least some example embodiments, the processor 320 may align (i.e., rank) the extracted featured based on a depth by using depth values corresponding to the features. For example, the processor 320 may align the features in order of largest to smallest depth values.

In operation 830, the processor 320 may determine a portion of the extracted features to be a background feature.

According to at least some example embodiments, the processor 320 may determine, to be the background feature, a preset or, alternatively, desired number of features among the features aligned based on the depth. For example, according to at least some example embodiments, the processor 320 may determine, to be the background feature, the M highest ranked features (i.e., the M features having the largest depth values) among the aligned features, where M is a positive integer that represents the aforementioned preset or, alternatively, desired number. According to at least some example embodiments, M may be a positive integer that is less than a total number of the aligned features. According to at least some example embodiments, M may be a positive integer that equal to or greater than a total number of the aligned features.

In another example, the processor 320 may perform segmentation on the aligned features based on the depth values. The processor 320 may determine a background depth based on the depth values of the aligned features. The processor 320 may determine the background feature among the aligned features based on the background depth.

As an example, the processor 320 may classify the aligned features into groups of preset or, alternatively, desired ranges based on the depth values (i.e., depth value ranges). Among the groups, the processor 320 may determine a group to be a background group based on the depth value range of the group and a threshold value. For example, among the groups, the processor 320 may determine a group having a depth value, depth value range, and/or average depth value greater than or equal to the threshold to be a background group. The processor 320 may determine features included in the background group to be the background feature.

Figure 11:
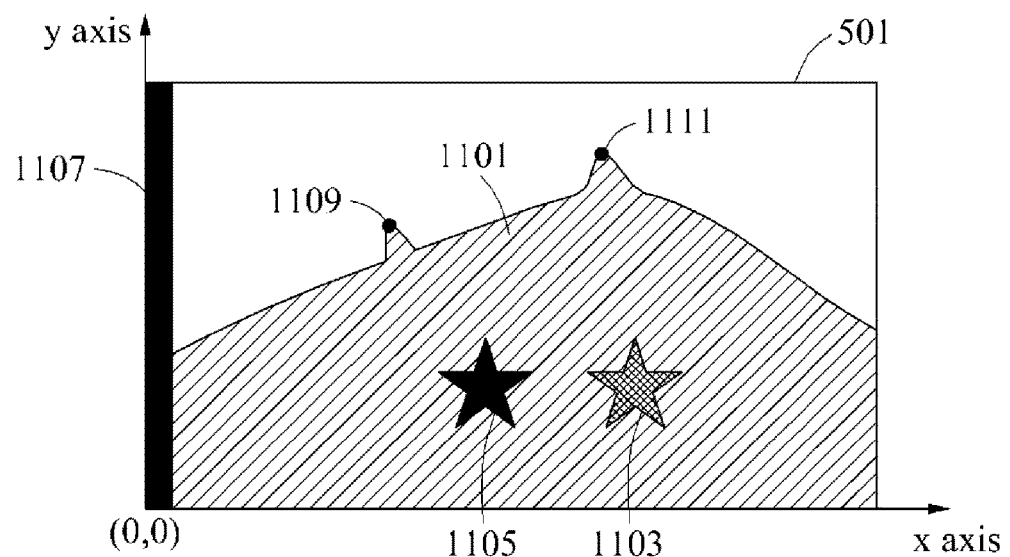
FIG. 11 illustrates an example of a background feature.

Descriptions related to the background feature will be provided with reference to FIG. 11.

FIG. 9 is a flowchart illustrating an example of a method of calculating a conversion relationship based on a background feature.

The foregoing operation 720 may include operations 910 through 940.

In operation 910, the processor 320 may detect a first background feature of a first color image. The first color image may be included in the plurality of color images 500.

The first background feature may correspond to an extracted background feature extracted in operation 710 of FIG. 7. For example, in operation 910, the processor 320 may extract features from the first color image, and detect, as the first background feature, a feature of which a difference from the background feature extracted in operation 710 is less than a threshold among the features extracted from the first color image.

In operation 920, the processor 320 may detect a second background feature of a second color image. The second color image may be included in the plurality of color images 500. The second color image may be an image temporally neighboring the first color image. As an example, when the first color image is a $t^{th}$ image, the second color image may be a $(t+1)^{th}$ image.

The second background feature may correspond to an extracted background feature extracted in operation 710 of FIG. 7. For example, the processor 320 may extract features from the second color image, and detect, as the second background feature, a feature of which a difference from the background feature extracted in operation 710 is less than a threshold value among the features extracted from the second color image.

In operation 930, the processor 320 may match the first background feature and the second background feature.

According to at least some example embodiments, the processor 320 may match coordinates related to the first background feature and coordinates related to the second background feature.

In operation 940, the processor 320 may calculate a conversion relationship between the first color image and the second color image based on the matching.

According to at least some example embodiments, the processor 320 may calculate the conversion relationship between the first color image and the second color image based on the matched coordinates.

As an example, when the first background feature of the first color image is Ft and the second background feature of the second color image is Ft+1, the conversion relationship may be calculated based on Equation 1.

$$F_{t+1} = H_t F_t \quad \text{[Equation 1]}$$

In Equation 1, $H_t$ denotes the conversion relationship between the first color image and the second color image. The conversion relationship may be a 3×3 homography matrix.

The first background feature $F_t$ may be expressed as shown in Equation 2. The first background feature may have coordinates (x, y) in the first color image.

$$F_t = \begin{bmatrix} x \\ y \\ 1 \end{bmatrix} \quad \text{[Equation 2]}$$

The second background feature $F_{t+1}$ may be expressed as shown in Equation 3. The second background feature may have coordinates (x', y') in the second color image.

$$F_{t+1} = \begin{bmatrix} x' \\ y' \\ 1 \end{bmatrix} \quad \text{[Equation 3]}$$

The conversion relationship may be expressed as shown in Equation 4.

$$\begin{bmatrix} x' \\ y' \\ 1 \end{bmatrix} = \begin{bmatrix} h1 & h2 & h3 \\ h4 & h5 & h6 \\ h7 & h8 & h9 \end{bmatrix} \begin{bmatrix} x \\ y \\ 1 \end{bmatrix} \quad \text{[Equation 4]}$$

According to at least some example embodiments, when a plurality of background features is matched, the processor 320 may calculate values of h1 through h9 such that $H_t$ has a minimum mean square error.

According to at least some example embodiments, operations 910 through 940 may be repetitively performed by changing a color image to be processed. For example, the processor 320 may calculate the conversion relationship $H_t$ between the first color image and the second color image, and then calculate a conversion relationship $H_{t+1}$ between the second color image and a third color image.

According to at least some example embodiments, the processor 320 may divide a color image into a plurality of sub-color images and calculate a conversion relationship of the sub-color images. Descriptions related to a method of calculating the conversion relationship of the sub-color images will be provided with reference to FIG. 24.

Figure 10:
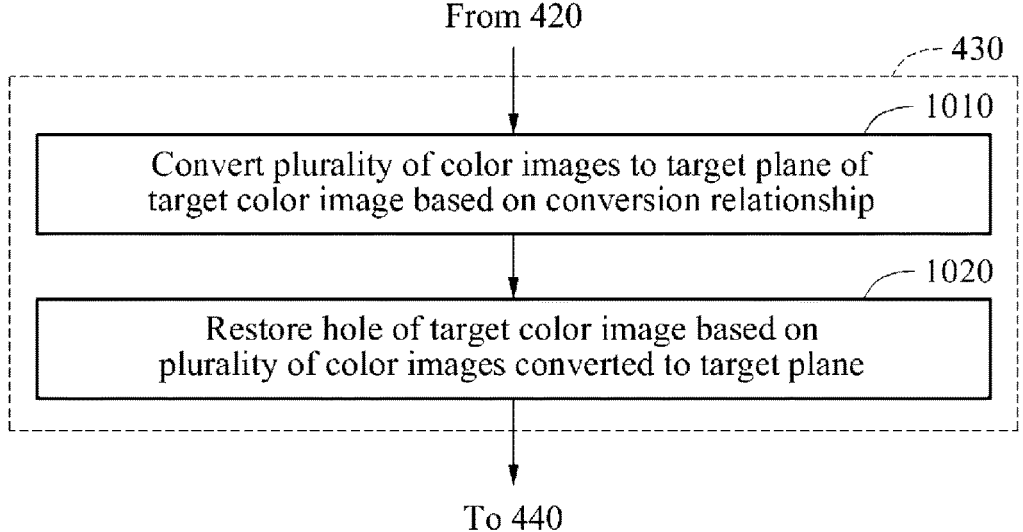
FIG. 10 is a flowchart illustrating an example of a method of restoring a hole in a target color image according to at least one example embodiment.

FIG. 10 is a flowchart illustrating an example of a method of restoring a hole in a target color image according to at least one example embodiment.

The foregoing operation 430 may include operations 1010 and 1020.

In operation 1010, the processor 320 may convert each of a plurality of color images to a target plane of a target color image based on a conversion relationship.

The processor 320 may convert the plurality of color images to the same plane as the target color image.

As an example, when the target color image is a $t^{th}$ image, a $(t-1)^{th}$ color image may be converted to the same plane as the target color image based on Equation 5.

$$I_{t(t-1)} = H_{t-1} \cdot I_{t-1} \quad \text{[Equation 5]}$$

In Equation 5, $I_{t-1}$ indicates information on the $(t-1)^{th}$ color image. For example, $I^{th}$ may include a color value corresponding to coordinates of a pixel in the $(t-1)^{th}$ color image.

$I_{t(t-1)}$ indicates information on an image obtained by converting the $(t-1)^{th}$ color image to the target plane.

Since the conversion relationship of temporally neighboring color images is calculated, a color image that is not temporally located adjacent to the target color image may also be converted to the target plane.

As an example, when the target color image is the $t^{th}$ image, a $(t-N)^{th}$ color image may be converted to the same plane as the target color image based on Equation 6.

$$I_{t(t-N)} = H_{t-1} \cdot H_{t-2} \cdot H_{t-3} \cdot \ldots \cdot H_{t-N} \cdot I_{t-N} \quad \text{[Equation 6]}$$

In Equation 6, $I_t(t-N)$ indicates information on an image obtained by converting the $(t-N)^{th}$ color image to the target plane.

As another example, the target color image is the $t^{th}$ image, a $(t+N)^{th}$ color image may be converted to the same plane as the target color image based on Equation 7.

$$I_{t(t=N)} = (H_t)^{-1} \cdot (H_{t+1})^{-1} \cdot (H_{t+2})^{-1} \cdot \ldots \cdot (H_{t+N-1})^{-1} \cdot I_{t+N} \quad \text{[Equation 7]}$$

In Equation 7, $I_t(t+N)$ indicates information on an image obtained by converting the $(t+N)^{th}$ color image to the target plane.

According to at least some example embodiments, a target plane corresponds to a target color image (or target depth image), and converting a particular color image (or depth image) to the target plane may be defined as applying, to the particular color image (or depth image), each conversion relationship H between the particular color image (or depth image) and the target color image (or target depth image), for example, in the manner shown above with respect to Equations 5-7 and illustrated in FIG. 6.

In operation 1010, the processor 320 may convert a plurality of depth images to a target plane of a target depth image based on the conversion relationship. A method of converting the plurality of depth images to the target plane of the target depth image may be similar to the method of converting the plurality of color images to the target planes of a target color image.

In operation 1020, the processor 320 may restore a hole of the target color image based on the plurality of color images converted to the target plane. Descriptions related to a method of restoring the hole will be provided with reference to FIGS. 12 through 14.

FIG. 11 illustrates an example of a background feature.

The target color image 501 may include a foreground 1103 and a background 1101. A hole 1105 may be a background exposed by the foreground 1103. A hole 1107 may be a hole that is not be viewed in the target color image 501.

The processor 320 may extract features 1103, 1109, and 1111 of the target color image 501. The foreground 1103 may be extracted as the feature.

Among the extracted features 1103, 1109, and 1111, the processor 320 may determine the features 1109 and 1111 to be background features based on depth values of the features 1103, 1109, and 1111. Depth values corresponding to the determined background features 1109 and 1111 may be greater than or equal to a preset or, alternatively, desired threshold depth value.

As an example, the background features 1109 and 1111 may correspond to coordinates of single pixels, respectively.

As another example, the background features 1109 and 1111 may be an area of which a size (e.g., in pixels) is set in advance.

Figure 12:
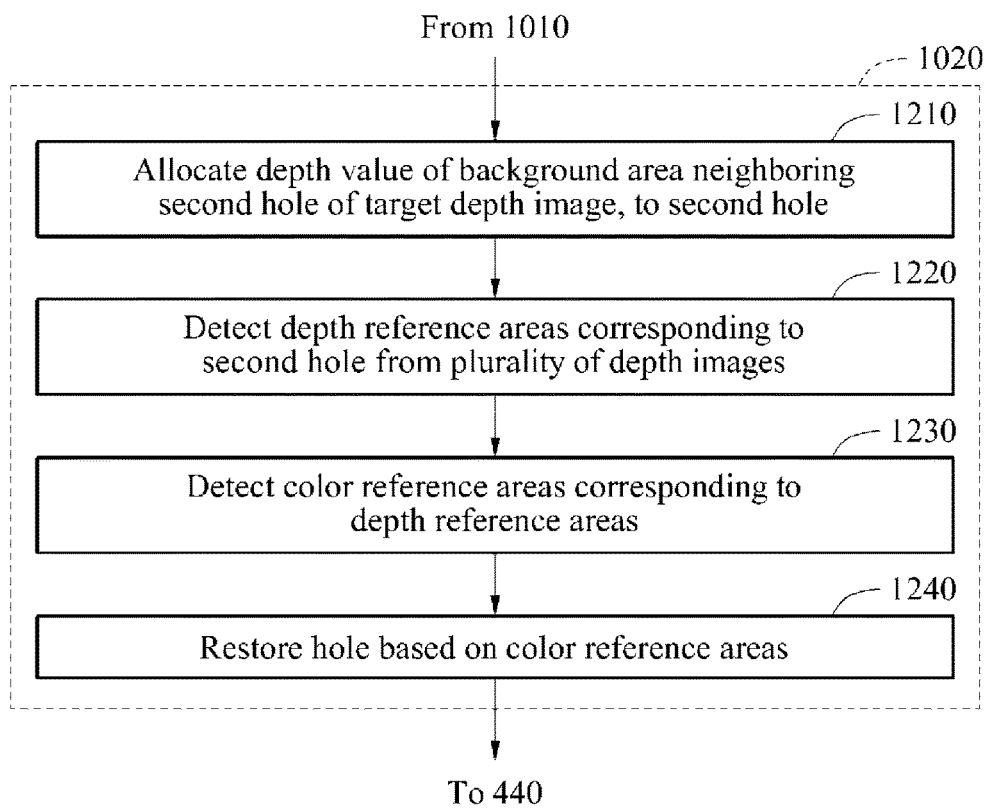
FIG. 12 is a flowchart illustrating an example of a method of restoring a hole in a target color image based on a plurality of color images converted to a target plane.

FIG. 12 is a flowchart illustrating an example of a method of restoring a hole in a target color image based on a plurality of color images converted to a target plane.

The foregoing operation 1020 may include operations 1210 through 1240.

In operation 1210, the processor 320 may allocate a depth value of a background area neighboring a second hole of a target depth image of a second viewpoint, to the second hole. The target depth image may be previously generated in operation 410 of FIG. 4.

A second hole exposed in a depth image due to a movement of a foreground portion of the image may have a relatively high or, alternatively, highest probability of being included in a background portion of the depth image. The processor 320 may allocate the depth value of the background area neighboring the second hole to the second hole.

In operation 1220, the processor 320 may detect depth reference areas corresponding to the second hole from a plurality of depth images. The plurality of depth images may be depth images that have been converted to a target plane and correspond to a plurality of color images that have been converted to the target plane.

As an example, the depth reference areas may be an area of a plurality of depth images having the same coordinates as that of the second hole.

Figure 14:
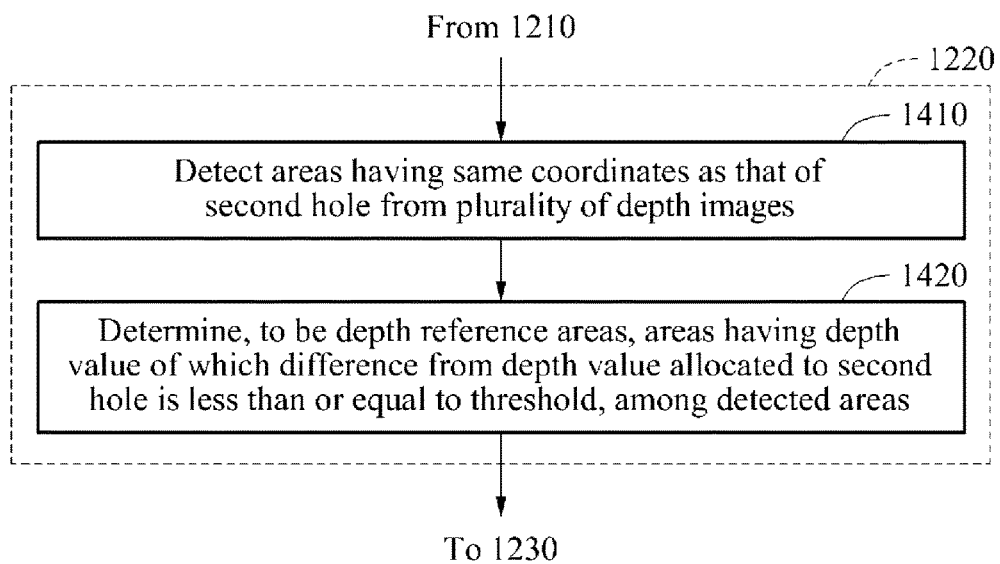
FIG. 14 is a flowchart illustrating an example of a method of detecting depth reference areas.

Descriptions related to a method of detecting the depth reference areas will be provided with reference to FIG. 14.

In operation 1230, the processor 320 may detect color reference areas of the plurality of color images converted to the target plane corresponding to the detected depth reference areas.

As an example, a depth reference area and a color reference area may correspond to each other. For example, the depth reference area and the color reference area corresponding to each other may have the same coordinates in an image. According to at least some example embodiments, in operation 1230, for a selected detected depth reference area, the processor 320 may detect, as the color reference areas corresponding to the selected detected depth reference area, pixels of all of the plurality of converted color images that correspond to the pixels of the selected detected depth reference area. According to at least some example embodiments, in operation 1230, the processor 320 may perform, for all of the detected depth reference areas (e.g., the depth reference areas detected in operation 1220), the same operations described above with respect to the selected detected depth reference area.

In operation 1240, the processor 320 may restore a hole of a target color image based on the detected color reference areas.

As an example, the processor 320 may restore the hole by setting an average of color values of the color reference areas to be a color value of the hole.

As another example, the processor 320 may restore the hole by setting a color value having a greatest appearing frequency among the color values of the color reference areas to be the color value of the hole.

For example, according to at least some example embodiments, in operation 1240, the processor 320 may restore the hole on a pixel-by pixel basis. For example, for a selected pixel of the hole, the processor 320 may determine an average pixel value or a most frequently occurring pixel value from among a plurality of pixels corresponding to the selected pixel of the hole. With respect to operation 1240, the plurality of pixels that correspond to the selected pixel of the hole may be defined as the pixels, from among the color reference areas of the plurality of color images converted to the target plane, that have the same location (e.g., coordinates) as the selected pixel of the hole. According to at least some example embodiments, in operation 1240, the processor 320 may perform, for all of the pixels in the hole, the same operations described above with respect to the selected pixel in the hole.

Figure 13:
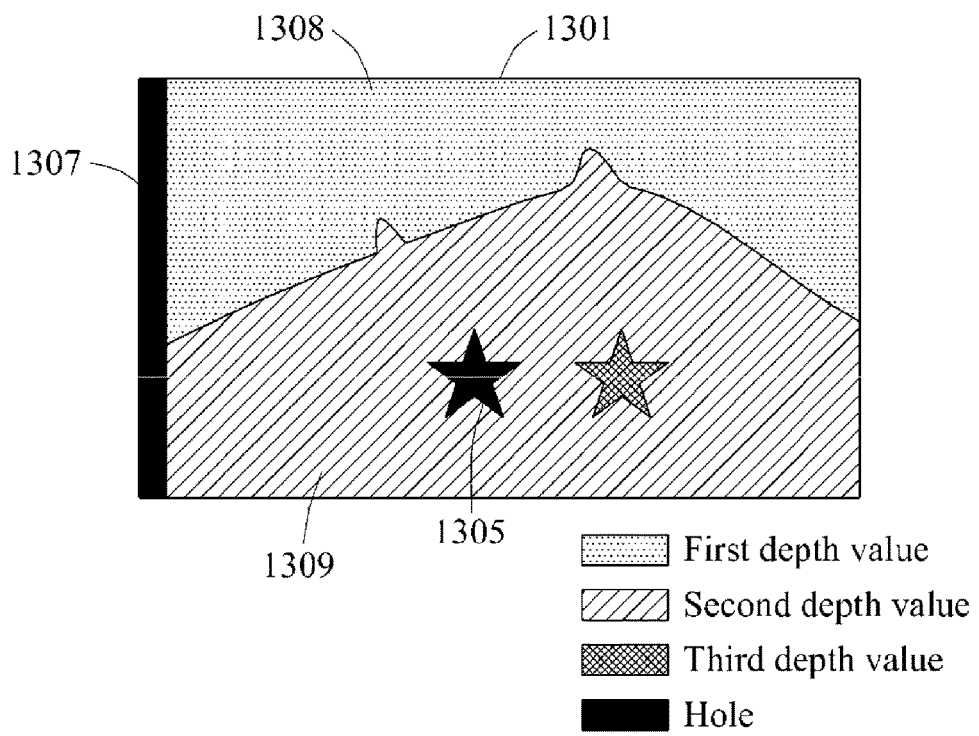
FIG. 13 illustrates an example of a target depth image.

FIG. 13 illustrates a target depth image 1301.

The target depth image 1301 may correspond to the aforementioned target color image 501.

The target depth image 1301 may include second holes 1305 and 1307.

As an example, the processor 320 may set a depth value of a background area 1309 neighboring the second hole 1305 to be a depth value of the second hole 1305.

As another example, the processor 320 may set a depth value of a background area 1308 or a background area 1309 neighboring the second hole 1307 to be a depth value of the second hole 1307.

FIG. 14 is a flowchart illustrating an example of a method of detecting depth reference areas.

The foregoing operation 1220 may include operations 1410 and 1420.

In operation 1410, the processor 320 may detect areas having the same coordinates as that of a second hole from a plurality of depth images.

In operation 1420, among the detected areas, the processor 320 may determine, to be depth reference areas, areas having a depth value of which a difference from a depth value allocated to the second hole is less than or equal to a threshold value.

Based on the image processing method described with reference to FIGS. 4 through 14, a hole of an output image may be restored.

Descriptions related to a method of restoring the hole of the output image will be also provided as an example with reference to FIGS. 15 through 23.

Figure 15:
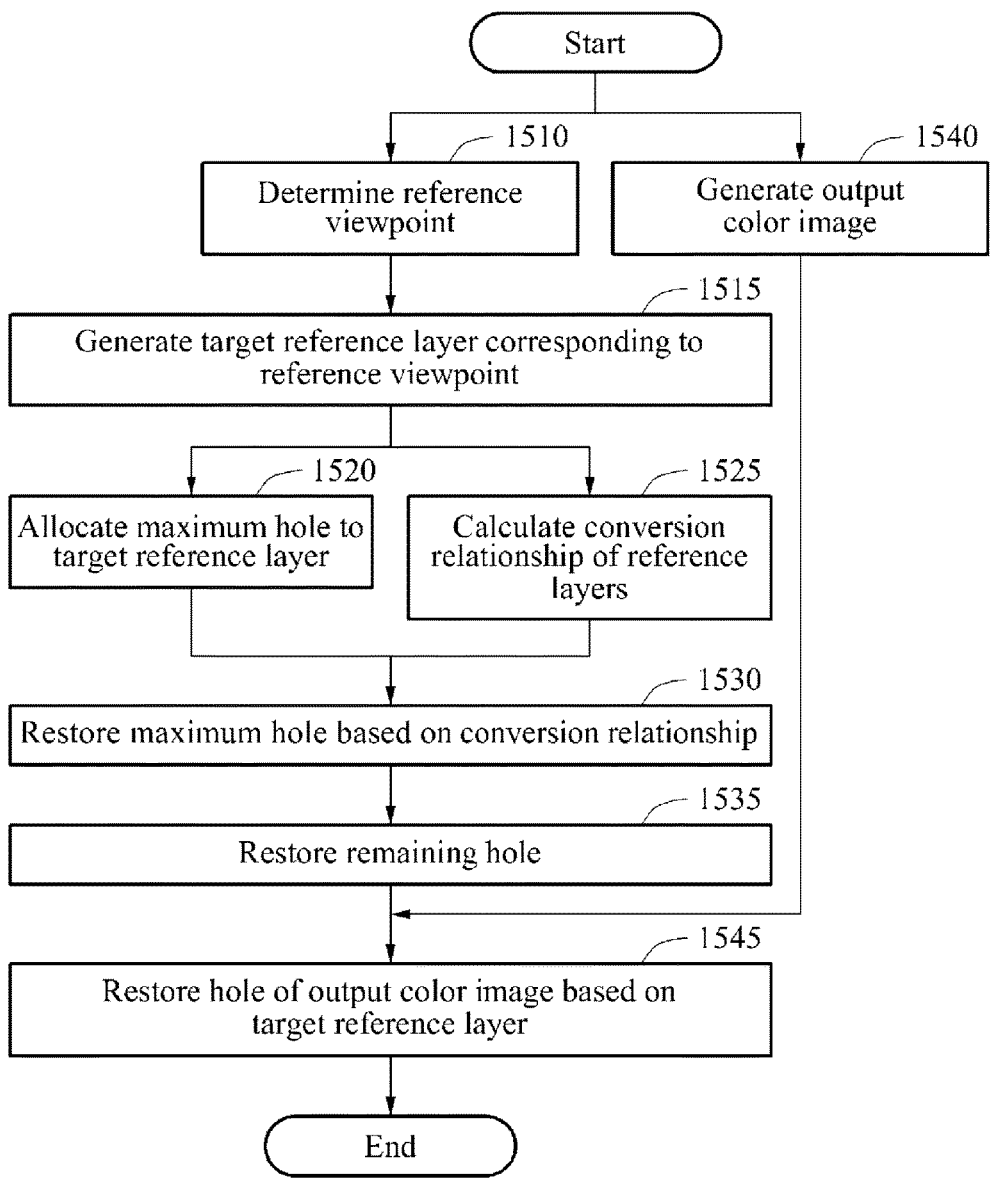
FIG. 15 is a flowchart illustrating another example of an image processing method.

FIG. 15 is a flowchart illustrating another example of an image processing method.

In advance of operation 1510, the communicator 310 may receive an input video or an input image from a differing device. The differing device may be, for example, a camera configured to acquire the input video and the input image.

The communicator 310 may receive one or more input depth images and one or more input color images captured at, or generated with respect to, one or more viewpoints. The one or more input color images may be images, each acquired at a different viewpoint and at the same time. The one or more input color images have a same temporal location. The one or more input depth images may correspond to the one or more input color images, respectively.

A $t^{th}$ virtual viewpoint output color image may be generated based on one or more $t^{th}$ input color images. A virtual viewpoint output color image may include a hole. When a $t^{th}$ background layer is present, the hole of the output color image may be restored based on the $t^{th}$ background layer.

A method of generating the $t^{th}$ background layer and restoring a hole of a $t^{th}$ output color image based on the generated $t^{th}$ background layer will be explained with reference to the following descriptions.

Hereinafter, the $t^{th}$ background layer may also be referred to as a target reference layer.

In operation 1510, the processor 320 may determine a reference viewpoint based on one or more viewpoints corresponding to one or more input color images.

The reference viewpoint may be a viewpoint of, for example, a reference layer, a target reference layer, and a hole map.

Figure 16:
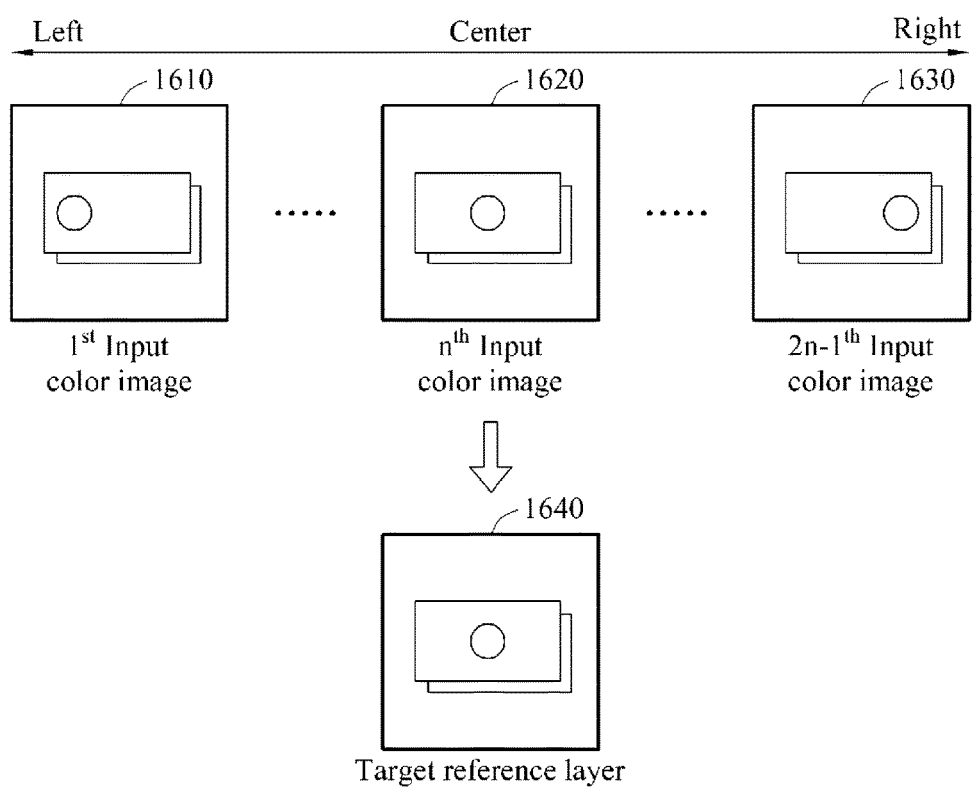
FIG. 16 illustrates an example of a target reference layer.

Descriptions related to a method of determining the reference viewpoint will be provided as an example with reference to FIG. 16.

In operation 1515, the processor 320 may generate a target reference layer corresponding to the reference viewpoint based on the one or more input color images. According to at least some example embodiments, the generation of the target reference layer in operation 1515 includes the processor 320 setting or designating, as the target reference layer, an input color image of the reference viewpoint determined in operation 1510. For example, in the present disclosure, images (e.g., input color images) of the viewpoint determined in operation 1510 to be the reference viewpoint may be referred to as "reference layers," and in operation 1515, the processor selects one of the reference layers as the target reference layer. The target reference layer may be, for example, the $t^{th}$ reference layer generated to generate the virtual viewpoint output color image based on the one or more $t^{th}$ input color images.

In operation 1520, the processor 320 may allocate, to the target reference layer, a maximum hole to be generated by warping the target reference layer to a desired or, alternatively, predetermined viewpoint.

Figure 17:
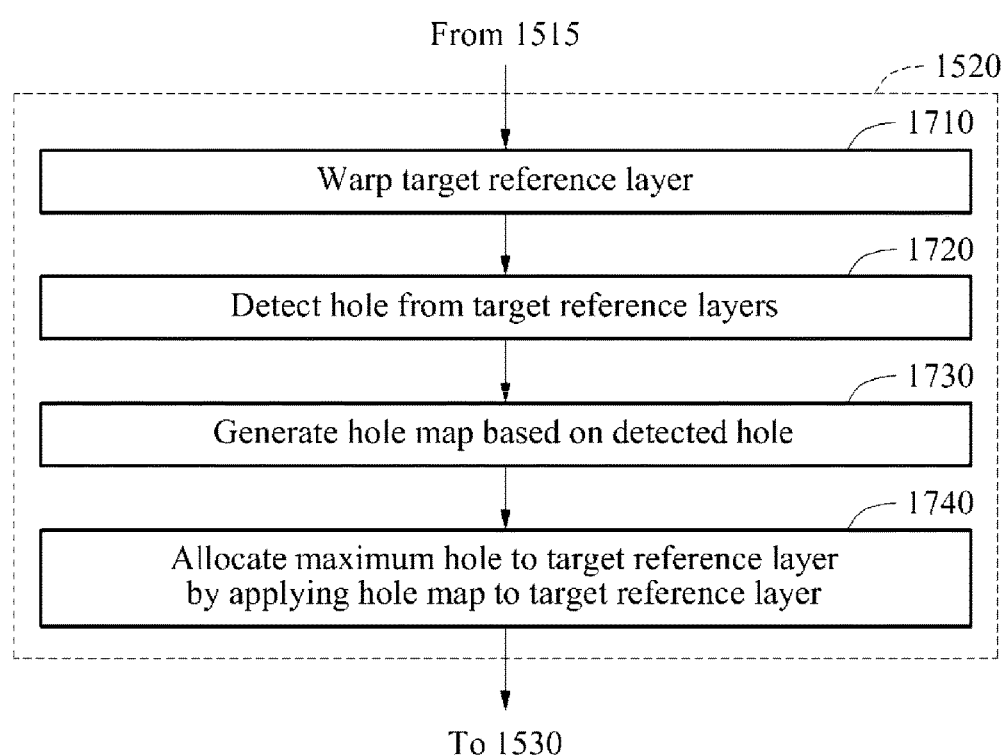
FIG. 17 illustrates an example of a method of allocating a maximum hole to a target reference layer.
Figure 18:
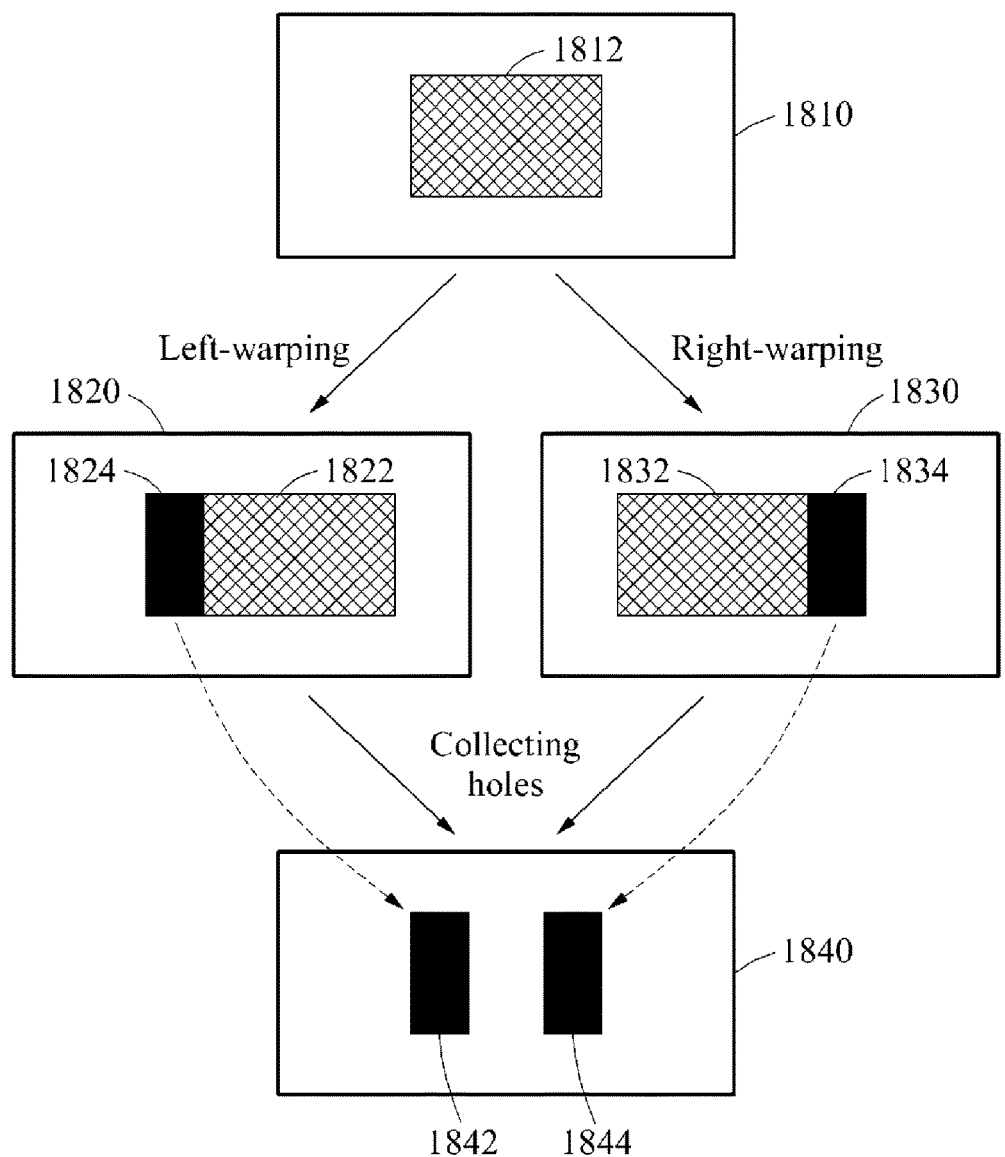
FIG. 18 illustrates an example of a hole map generation method.

Descriptions related to a method of allocating the maximum hole to the target reference layer will be provided with reference to FIGS. 17 through 19.

In operation 1525, the processor 320 may calculate a conversion relationship of temporally neighboring reference layers among a plurality of reference layers of the reference viewpoint, the plurality of reference layers including the target reference layer.

Each of the reference layers may be a target reference layer of input color images temporally neighboring the plurality of input color images. The plurality of reference layers have different temporal locations. For example, a $(t-1)^{th}$ reference layer may be a target reference layer for a plurality of $(t-1)^{th}$ input color images.

The conversion relationship may indicate a homography of temporally neighboring reference layers.

Descriptions related to a method of calculating the conversion relationship of the temporally neighboring reference layers among the plurality of reference layers will be provided with reference to FIG. 16.

Operations 1520 through 1525 may be performed in parallel.

In operation 1530, the processor 320 may restore the maximum hole allocated to the target reference layer based on the conversion relationship.

Figure 22:
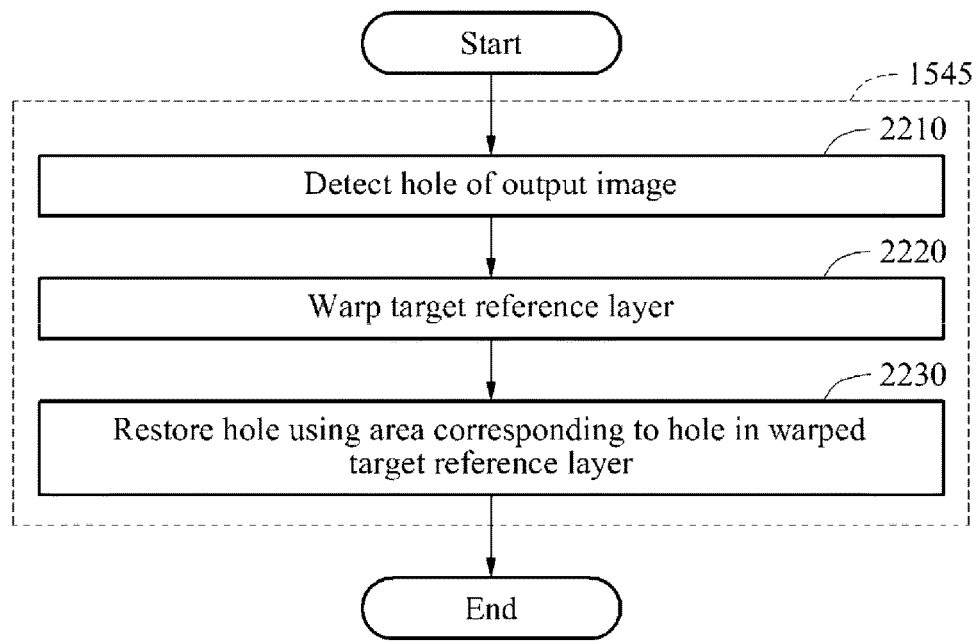
FIG. 22 is a flowchart illustrating an example of a method of restoring a hole in an output image.

Descriptions related to a method of restoring the maximum hole will be provided with reference to FIG. 22.

In operation 1535, when a remaining hole is present in the target reference layer, the processor 320 may restore the remaining hole (if such a hole exists) using the target reference layer. The processor 320 may set a patch including the remaining hole within the target reference layer. The processor 320 may detect an optimal patch within the target reference layer, which is most similar to the set patch. The processor 320 may restore a remaining hole in the target reference layer based on the optimal patch.

According to at least some example embodiments, the processor 320 may set a patch including the remaining hole and search the target reference layer for an optimal patch that is the most similar patch to the set patch or, alternatively, a desired patch which is a patch having a level of similarity with respect to the set patch that exceeds a threshold value.

Operation 1535 may be selectively performed based on whether the remaining hole is present.

Operation 1540 may be performed in parallel to operations 1510 through 1535.

In operation 1540, the processor 320 may generate an output color image by warping at least one of the plurality of input color images to an output viewpoint.

As an example, the processor 320 may generate the output color image based on an input depth image corresponding to an input color image used in the warping.

A hole may be present in the output color image.

In operation 1545, the processor 320 may restore the hole of the output color image based on the target reference layer in which the maximum hole is restored.

Descriptions related to a method of restoring the hole of the output color image will be provided with reference to FIGS. 22 and 23.

FIG. 16 illustrates an example of a target reference layer.

According to at least some example embodiments, a number of a plurality of input color images may be 2n−1, n being a natural number.

A reference viewpoint may be a viewpoint of an input color image located on a center of the plurality of input color images. Among the (2n−1) input color images, the processor 320 may determine a viewpoint of an nth input color image, for example, a central input color image 1620, to be the reference viewpoint.

When the reference viewpoint is the same as a viewpoint of a desired or, alternatively, predetermined input color image among the plurality of input color images, the desired or, alternatively, predetermined input color image may be set or used as a target reference layer 1640. As an example, when the reference viewpoint is the viewpoint of the central input color image 1620, the central input color image 1620 may be set as the target reference layer 1640.

In another example, the number of the plurality of input color images may be 2n.

When the number of the plurality of input color images is 2n, the processor 320 may determine an intermediate viewpoint of the nth input color image and an $(n+1)^{th}$ input color image to be the reference viewpoint.

When the number of the plurality of input color images is 2, the processor 320 may generate the target reference layer of the reference viewpoint based on the plurality of input color images.

FIG. 17 illustrates an example of a method of allocating a maximum hole to a target reference layer.

The foregoing operation 1520 may include operations 1710 through 1740.

In operation 1710, the processor 320 may warp a target reference layer to one or more viewpoints. The one or more viewpoints may be, for example, one or more viewpoints to be determined as one or more output viewpoints.

In operation 1720, the processor 320 may detect one or more holes from warped target reference layers obtained through the warping. The processor 320 may detect, for example, one or more areas or groups of pixels to which no color value is allocated, as the one or more detected holes.

In operation 1730, the processor 320 may generate a hole map based on the one or more detected holes. Descriptions related to the hole map will be provided with reference to FIG. 18.

In operation 1740, the processor 320 may allocate the one or more detected holes or, alternatively, a maximum hole to the target reference layer by applying the hole map to the target reference layer.

FIG. 18 illustrates an example of a hole map generation method.

The processor 320 may warp a target reference layer 1810 to one or more viewpoints. The target reference layer 1810 may include a foreground 1812.

The processor 320 may warp the target reference layer 1810 to a viewpoint located in a left side of a reference viewpoint, thereby generating a first warped target reference layer 1820. The first warped target reference layer 1820 may include a hole 1824.

The processor 320 may warp the target reference layer 1810 to a viewpoint located in a right side of the reference viewpoint, thereby generating a second warped target reference layer 1830. The second warped target reference layer 1830 may include a hole 1834.

The processor 320 may detect the hole 1824 and the hole 1834.

The processor 320 may generate a hole map 1840 by collecting the detected holes 1824 and 1834 in one layer. The hole map 1840 may indicate the locations of the one or more detected holes (e.g., the holes 1824 and 1834). In a case where the warping of the target reference layer is performed using the most extreme viewpoints, the one or more detected holes constitute a "maximum hole." According to at least some example embodiments, the term "most extreme viewpoints" refers to the available viewpoints that are farthest from the reference viewpoint of the target reference layer with respect to all available directions, where the processor 320 may define which viewpoints and directions are available based on, for example, preferences of a user of the apparatus 300, constraints defined by the software the processor 320 is executing, and/or processing constraints of the processor 320. For ease of description, in the examples shown in FIGS. 18 and 19, the one or more detected holes (e.g., the holes 1824 and 1834) are assumed to be a maximum hole.

However, according to at least some example embodiments, the warping of the target reference layer is not performed using the most extreme viewpoints, and thus, the one or more detected holes, which are detected based on the warping of the target reference layer, are not a maximum hole. According to at least some example embodiments, the one or more detected holes may be used in operations 1520 and 1525 instead of a maximum hole.

FIG. 19 illustrates an example of a target reference layer to which a maximum hole is allocated.

The processor 320 may generate a target reference layer 1910 to which a maximum hole is allocated by applying the hole map 1840 to the target reference layer 1810.

Thereafter, a background layer may be generated by restoring a hole of the target reference layer 1910 to which the maximum hole is allocated, to be a background.

Figure 20:
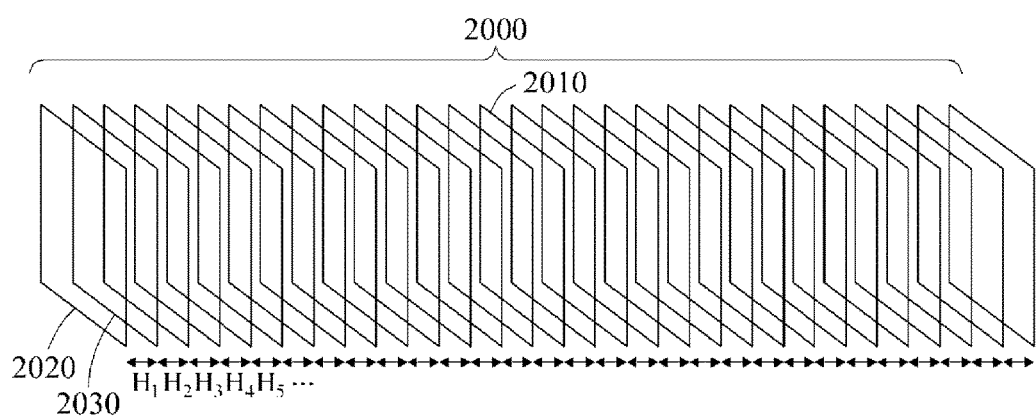
FIG. 20 illustrates an example of a conversion relationship of a plurality of reference layers.

FIG. 20 illustrates an example of a conversion relationship of a plurality of reference layers.

A plurality of reference layers 2000 may include a target reference layer 2010. For example, a (t−n)th reference layer of the plurality of reference layers 2000 may be a target reference layer of a plurality of (t−n)th input color images.

The foregoing descriptions related to operation 420 may be similarly applicable to a method of calculating the conversion relationship of the plurality of reference layers. The descriptions related to "the plurality of color images of the second viewpoint" of operation 420 may also be applicable to "the plurality of reference layers" of operation 1525.

As an example, a first reference layer 2020 and a second reference layer 2030 may be temporally neighboring reference layers. The processor 320 may calculate a conversion relationship between the first reference layer 2020 and the second reference layer 2030. The conversion relationship between the first reference layer 2020 and the second reference layer 2030 may be H1.

A conversion relationship between the second reference layer 2030 and a third reference layer temporally neighboring the second reference layer 2030 may be H2.

FIG. 21 illustrates an example of a target reference layer in which a maximum hole is restored.

The processor 320 may restore a hole of the target reference layer 1910 to which a maximum hole is allocated.

The processor 320 may restore holes 1914 and 1916 of the target reference layer 1910 to be a background.

The foregoing descriptions related to operation 430 may be similarly applicable to a method of restoring the holes 1914 and 1916. The descriptions related to "the target color image of the second viewpoint" of operation 430 may also be applicable to "the target reference layer" of operation 1530.

FIG. 22 is a flowchart illustrating an example of a method of restoring a hole in an output image.

The foregoing operation 1545 may include operations 2210 through 2230.

In operation 2210, the processor 320 may detect a hole of an output image generated in operation 1540.

In operation 2220, the processor 320 may warp a target reference layer to a viewpoint of the output image.

In operation 2230, the processor 320 may restore the hole using an area corresponding to the hole of the output image in the warped target reference layer.

Figure 24:
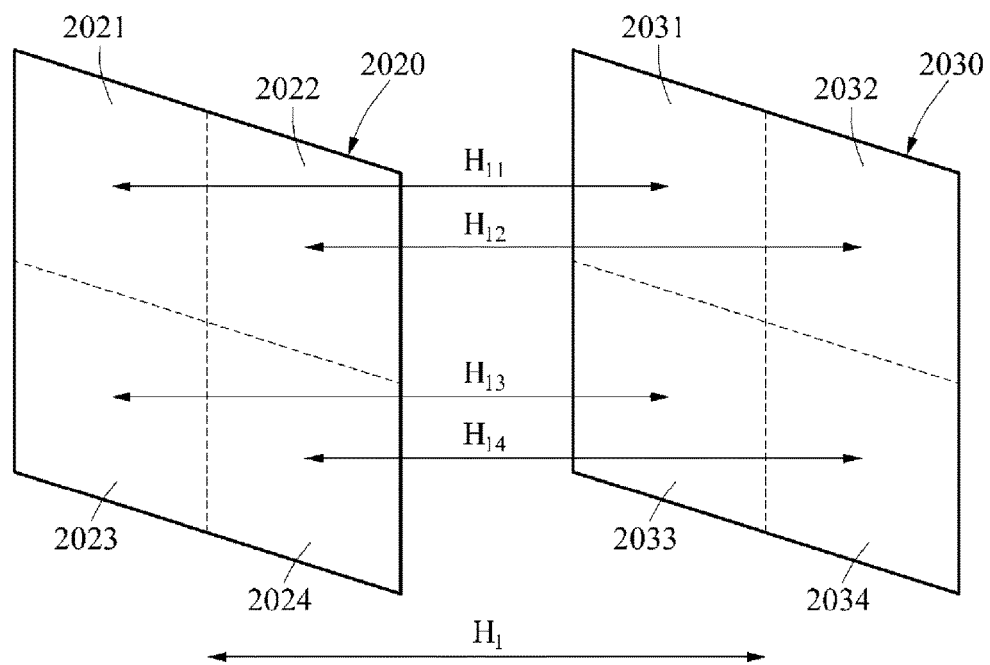
FIG. 24 illustrates an example of a method of calculating a conversion relationship through a segmentation of a differing image.

Descriptions related to a method of restoring the hole will be provided with reference to FIG. 24.

FIG. 23 illustrates an example of an output image in which a hole is restored.

A output image 2310 on which a warping is performed may include a hole 2314.

The processor 320 may warp a target reference layer to a viewpoint of the output image 2310 to generate a warped target reference layer 2320.

The processor 320 may detect an area 2324 corresponding to the hole 2314 from the warped target reference layer 2320. For example, the area 2324 may have the same coordinates as that of the hole 2314 in an image.

According to at least some example embodiments, the processor 320 may restore the hole 2314 by copying the area 2324 to be pasted to the hole 2314 of the output image 2310.

The processor 320 may restore the hole 2314, thereby generating an output image 2330 having a restored hole.

FIG. 24 illustrates an example of a method of calculating a conversion relationship through a segmentation of a differing image.

According to at least some example embodiments, the conversion relationship described with reference to the operations 420 and 1525 may be calculated as follows.

The processor 320 may divide the first reference layer 2020 into a plurality of sub-color images 2021 through 2024. The processor 320 may divide the second reference layer 2030 into a plurality of sub-color images 2031 through 2034.

The processor 320 may calculate a sub-conversion relationship between corresponding sub-color images. For example, the processor 320 may calculate a sub-conversion relationship between the sub-color image 2021 of the first reference layer 2020 and the sub-color image 2031 of the second reference layer 2030.

The processor 320 may restore a maximum hole of a target reference layer based on the calculated sub-conversion relationship.

According to at least some example embodiments, the apparatus 300 may be embodied in or as an electronic device examples of which includes, but are not limited to, personal electronic device including a digital camera, mobile phone, laptop or tablet. The electronic device according to at least some example embodiments may be a device capable of capturing two-dimensional (2D) video data. The electronic device according to at least some example embodiments may be a device capable of capturing depth data in addition to 2D video data. The electronic device according to at least some example embodiments includes an application (app), software function and/or circuitry configured to receive video data (e.g., 2D video data stored on the personal electronic device) as input, and apply the image processing methods described above with respect to any or all of FIGS. 1-24 to transform 2D video data into a hands-free three-dimensional (3D) format.

According to at least some example embodiments, a user may be capable of using the electronic device according to at least some example embodiments to create and view a hands-free 3D version of user-created 2D video on-demand while, in some cases, using the same electronic device with which the user captured the original 2D video. The electronic device according to at least some example embodiments may transform 2D video data to a hands-free 3D format in response to a request entered into the electronic device by the user. For example, the user may choose a 2D video file stored on the electronic device and enter a command causing the electronic device according to at least some example embodiments to transform 2D video data to a hands-free 3D format. In addition to, or as an alternative to, responding to the request of the user, the electronic device according to at least some example embodiments may perform the transformation of 2D video data to a hands-free 3D format automatically.

The units and/or modules described herein may be implemented using hardware components and software components. For example, the hardware components may include microphones, amplifiers, band-pass filters, audio to digital convertors, and processing devices. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

Example embodiments of the inventive concepts having thus been described, it will be obvious that the same may be varied in many ways. Such variations are not to be regarded as a departure from the intended spirit and scope of example embodiments of the inventive concepts, and all such modifications as would be obvious to one skilled in the art are intended to be included within the scope of the following claims.

What is claimed is:

1. An image processing method comprising:
generating a target color image of a second viewpoint by warping a color image of a first viewpoint to the second viewpoint using a depth image corresponding to the color image of the first viewpoint;
determining a conversion relationship of temporally neighboring color images among a plurality of color images of the second viewpoint, the plurality of color images including the target color image; and
restoring a first hole of the target color image based on the conversion relationship.

2. The method of claim 1, further comprising:
restoring a remaining hole of the target color image using the target color image.

3. The method of claim 1, wherein the conversion relationship indicates a homography of the temporally neighboring color images.

4. The method of claim 1, wherein the determining comprises:
extracting a background feature of the plurality of color images; and
calculating the conversion relationship based on the extracted background feature.

5. The method of claim 4, wherein the extracting comprises:
extracting a plurality of features of the plurality of color images;
ranking the plurality of features based on a depth using depth values corresponding to the plurality of features; and
determining a first number of features among the ranked features to be the extracted background feature.

6. The method of claim 5, wherein the extracting of the plurality of features includes extracting a structure in the plurality of color images as at least one feature of the plurality of features.

7. The method of claim 4, wherein the calculating of the conversion relationship based on the background feature comprises:
detecting a first background feature of a first color image based on the extracted background feature;
detecting a second background feature of a second color image based on the extracted background feature;
matching the first background feature and the second background feature; and
calculating the conversion relationship based on a result of the matching,
wherein the first color image and the second color image are the temporally neighboring color images.

8. The method of claim 1, wherein the restoring comprises:
converting each of the plurality of color images to a target plane of the target color image based on the conversion relationship; and
restoring the first hole based on a result of the converting.

9. The method of claim 8, wherein the restoring of the first hole based on the result of the converting comprises:
allocating a depth value of a background area located adjacent to a second hole of a target depth image corresponding to the target color image to the second hole, the second hole corresponding to the first hole;
detecting depth reference areas corresponding to the second hole from a plurality of depth images corresponding to the plurality of color images converted to the target plane;
detecting color reference areas of the plurality of color images converted to the target plane, the color reference areas corresponding to the depth reference areas; and
restoring the first hole based on the color reference areas.

10. The method of claim 9, wherein the detecting of the depth reference areas comprises:
detecting areas having the same coordinates as coordinates of the second hole from the plurality of depth images; and
determining, to be the depth reference areas, areas of depth values among the detected areas, each having a difference from the depth value allocated to the second hole that is less than or equal to a threshold.

11. The method of claim 9, wherein the restoring of the first hole based on the color reference areas includes restoring the first hole by setting an average of color values of the color reference areas to be a color value of the first hole.

12. The method of claim 9, wherein the restoring of the first hole based on the color reference areas includes restoring the first hole by setting a color value having a greatest appearance frequency among color values of the color reference areas, to be a color value of the first hole.

13. An image processing apparatus comprising:
a memory storing computer-readable instructions; and
one or more processors configured to execute the computer-readable instructions such that the one or more processors are configured to,
generate a target color image of a second viewpoint by warping a color image of a first viewpoint to the second viewpoint based on a depth image corresponding to the color image of the first viewpoint, and
determine a conversion relationship between temporally neighboring color images among a plurality of color images of the second viewpoint, the plurality of color images of the second viewpoint including the target color image, and
restore a first hole of the target color image based on the conversion relationship.

14. An image processing method comprising:
determining a reference viewpoint based on a plurality of viewpoints of a plurality of input color images;
determining a target reference layer corresponding to the reference viewpoint based on the plurality of input color images;
determining a conversion relationship between temporally neighboring reference layers among a plurality of reference layers of the reference viewpoint, the plurality of reference layers including the target reference layer;
allocating a maximum hole to be generated through a warping of the target reference layer, to the target reference layer;
restoring the maximum hole based on the conversion relationship;
generating an output color image by warping at least one of the plurality of input color images to an output viewpoint; and
restoring a hole of the output color image based on the target reference layer.

15. The method of claim 14, further comprising:
restoring a remaining hole of the target reference layer based on the target reference layer.

16. The method of claim 14, wherein the conversion relationship indicates a homography of the temporally neighboring reference layers.

17. The method of claim 14, wherein the determining of the conversion relationship comprises:
extracting a background feature of the target reference layer; and
calculating the conversion relationship based on the background feature.

18. The method of claim 14, wherein the restoring of the maximum hole comprises:
converting the plurality of reference layers to a target plane of the target reference layer based on the conversion relationship; and
restoring the maximum hole based on a result of the converting.

19. An image processing method comprising:
receiving one or more input color images of one or more viewpoints, respectively;
setting a viewpoint from among the one or more viewpoints as a reference viewpoint;
setting a color image, from among the one or more input color images, as a target reference layer, the target reference layer corresponding to the reference viewpoint;
determining a plurality of conversion relationships by determining, for each temporally adjacent pair of reference layers among a plurality of reference layers of the reference viewpoint, a corresponding conversion relationship, the plurality of reference layers including the target reference layer;
warping the target reference layer to one or more viewpoints such that the target reference layer includes one or more holes;
restoring the target reference layer by restoring the one or more holes of the target reference layer based on the plurality of conversion relationships;
generating an output color image by warping an image from among the input color images to a first viewpoint such that the output color image includes a hole; and
restoring the hole of the output color image based on the restored target reference layer.

20. The method of claim 19, wherein the one or more input color images have a same temporal location, and the plurality of reference layers have different temporal locations.

21. The method of claim 20, wherein each conversion relationship, from among the plurality of conversion relationships, indicates a homography of the temporally adjacent pair of reference layers to which the conversion relationship corresponds.

22. The method of claim 19, wherein the restoring the one or more holes of the target reference layer comprises:

generating a plurality of converted reference layers by converting the plurality of reference layers to a target plane of the target reference layer based on the plurality of conversion relationships; and restoring the one or more holes of the target reference layer based on the plurality of converted reference layers.

23. The method of claim 19, wherein the restoring the hole of the output color image based on the restored target reference layer comprises:

replacing the hole of the output color image with a portion of the restored target reference layer, the portion of the restored target reference layer having a location within the restored target reference layer that corresponds to the location of the hole of the output color image within the output color image.

* * * * *